United States Patent
Arikawa et al.

(10) Patent No.: US 9,699,083 B2
(45) Date of Patent: Jul. 4, 2017

(54) FRAME SEARCH PROCESSING APPARATUS AND METHOD

(71) Applicant: NIPPON TELEGRAPH AND TELEPHONE CORPORATION, Tokyo (JP)

(72) Inventors: Yuki Arikawa, Tokyo (JP); Kenji Kawai, Tokyo (JP); Yukikuni Nishida, Tokyo (JP); Masami Urano, Tokyo (JP); Keiichi Koike, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 120 days.

(21) Appl. No.: 14/376,126

(22) PCT Filed: Feb. 12, 2013

(86) PCT No.: PCT/JP2013/053232
§ 371 (c)(1),
(2) Date: Jul. 31, 2014

(87) PCT Pub. No.: WO2013/122042
PCT Pub. Date: Aug. 22, 2013

(65) Prior Publication Data
US 2014/0376553 A1    Dec. 25, 2014

(30) Foreign Application Priority Data
Feb. 13, 2012 (JP) .................... 2012-028527

(51) Int. Cl.
*H04L 12/741* (2013.01)
*H04L 12/747* (2013.01)
*H04L 29/06* (2006.01)

(52) U.S. Cl.
CPC .......... *H04L 45/745* (2013.01); *H04L 45/742* (2013.01); *H04L 69/22* (2013.01)

(58) Field of Classification Search
None
See application file for complete search history.

(56) References Cited

U.S. PATENT DOCUMENTS 6,658,027 B1 * 12/2003 Kramer ................ H04J 3/0632
370/516
7,165,129 B1   1/2007 Okmianski et al.
(Continued)

FOREIGN PATENT DOCUMENTS

JP   2001-211203 A   8/2001
JP   2004-158903 A   6/2004
(Continued)

OTHER PUBLICATIONS

Urano et al., "The 10G-EPON OLT and ONU LSIs for the coexistence of 10G-EPON and GE-PON toward the next FTTH era", 2011 Symposium on VLSI Circuits (VLSIC), pp. 132-133, Jun. 15-17, 2011.
(Continued)

*Primary Examiner* — Brandon Renner
*Assistant Examiner* — Jay Vogel
(74) *Attorney, Agent, or Firm* — Blakely Sokoloff Taylor & Zafman LLP

(57) ABSTRACT

A frame search processing apparatus includes a frame information extraction unit (1) that extracts frame information from an input frame, a search processing unit (2) that compares the frame information with entry information, and a frame information output control unit (3) that controls output of the frame information to the search processing unit (2). The search processing unit (2) includes a plurality of comparison units that read out N pieces of entry information
(Continued)

from a search table, and perform comparison between the entry information and the frame information at once. The frame information output control unit (3) includes a frame information buffer that accumulates the frame information, and an output processing unit that, when triggered by a predetermined accumulation count of the frame information or an elapse of a predetermined accumulation time of the frame information, distributes a plurality of pieces of frame information accumulated in the frame information buffer to the comparison units of the search processing unit (2) one by one.

10 Claims, 16 Drawing Sheets

(56) References Cited

U.S. PATENT DOCUMENTS

| | | | | |
|---|---|---|---|---|
| 2002/0110146 | A1* | 8/2002 | Thayer | G07C 5/008 |
| | | | | 370/465 |
| 2003/0204653 | A1* | 10/2003 | Katayama | H04L 47/10 |
| | | | | 710/52 |
| 2004/0223505 | A1* | 11/2004 | Kim | H04L 12/5693 |
| | | | | 370/412 |
| 2007/0297414 | A1* | 12/2007 | Gupta | H04L 47/10 |
| | | | | 370/395.4 |
| 2008/0010419 | A1* | 1/2008 | Kao | G06F 13/1694 |
| | | | | 711/154 |
| 2009/0135826 | A1* | 5/2009 | Kim | H04L 47/2441 |
| | | | | 370/392 |
| 2010/0309787 | A1* | 12/2010 | Diab | H04L 12/12 |
| | | | | 370/236 |
| 2012/0143928 | A1* | 6/2012 | Yankov | G06F 17/30115 |
| | | | | 707/826 |

FOREIGN PATENT DOCUMENTS

| | | |
|---|---|---|
| JP | 2007-166421 A | 6/2007 |
| JP | 2011-055370 A | 3/2011 |

OTHER PUBLICATIONS

Chinese Office Action with English Language Translation, dated May 5, 2016, 201380008159.1.

* cited by examiner

FRAME SEARCH PROCESSING APPARATUS AND METHOD

TECHNICAL FIELD

The present invention relates to a frame search processing apparatus and method of performing search processing for deciding processing according to an input frame.

BACKGROUND ART

To perform transfer, discard, priority control, and the like of a frame in a router, a switch, or a bridge, search processing is necessary to decide processing according to an input frame. In search processing, information necessary for the search, for example, header information (to be referred to as frame information hereinafter) of a frame such as an IP address is extracted from an input frame, and the frame information is compared with a search condition, thereby outputting a result.

A search processing apparatus includes a search table that stores a plurality of search conditions (entry information), and a comparison circuit that compares frame information with data in the search table and performs matching determination. In the search processing, the apparatus accesses the search table every clock cycle, reads out a search condition, and compares it with frame information. This search processing is executed as many times as the total number of entry information, and access to the search table occurs as many times as the number of entry information. Power is consumed in each access to the search table.

On the other hand, when there are a lot of search conditions, or high-speed search processing is required, search processing is performed simultaneously for a plurality of pieces of frame information. To do this, an arrangement including parallelly arranged comparison circuits is employed. Such an arrangement is disclosed in, for example, literature "M. Urano, T. Kawamura, S. Ohteru, H. Suto, K. Kawai, R. Kusaba, N. Miura, J. Kato, A. Miyazaki, T. Hatano, S. Yasuda, N. Tanaka, S. Shigematsu, M. Nakanishi, T. Shibata, "The 10G-PON OLT and ONU LSIs for the coexistence of 10G-EPON and GE-PON toward the next FTTH era", 2011 Symposium on VLSI Circuits (VLSIC), pp. 132-133, 15-17 Jun. 2011". In the arrangement disclosed in this literature, eight pieces of frame information are processed in parallel. In addition, a search for one piece of frame information is done by parallelly performing eight comparison processes. When a plurality of pieces of frame information are processed by a plurality of comparison circuits in parallel, search table data is distributed to the plurality of comparison circuits by one access to the search table. That is, when the plurality of comparison circuits perform parallel processing, the time of access to the search table necessary for search processing of frame information in equal number shortens.

DISCLOSURE OF INVENTION

Problem to be Solved by the Invention

In the conventional search processing apparatus, however, when frames are input at an interval of a predetermined time (processing time of one frame) or more, or when the frame length is long, the time of access to the search table necessary for search processing of frame information in equal number increases. Since the search processing apparatus consumes power in each access to the search table, power consumption increases when the time of access to the search table or the count of access to the search table increases.

The present invention has been made in consideration of this situation, and has as its object to reduce power consumption by decreasing the time or count of access to a search table.

Means of Solution to the Problem

According to the present invention, there is provided a frame search processing apparatus comprising a frame information extraction unit that extracts frame information necessary for frame search processing from an input frame, a search processing unit that compares the frame information with entry information that is a predetermined search condition, and a frame information output control unit that controls output of the frame information to the search processing unit, wherein the search processing unit comprises a search table that stores M (M is an integer: M≥2) pieces of entry information in advance, and a plurality of comparison units that each input the frame information of different frames, read out N (N is a positive integer: N≤M) pieces of entry information out of the M pieces of entry information sequentially, and perform comparison between the readout entry information and the input frame information at once, and the frame information output control unit comprises a frame information buffer that accumulates the frame information extracted by the frame information extraction unit, and an output processing unit that, when triggered by one of a predetermined accumulation count of the frame information and an elapse of a predetermined accumulation time of the frame information in the frame information buffer, distributes a plurality of pieces of frame information accumulated in the frame information buffer to the comparison units of the search processing unit one by one.

According to the present invention, there is provided a frame search processing method comprising a frame information extraction step of extracting frame information necessary for frame search processing from an input frame, a search processing step of comparing the frame information with entry information that is a predetermined search condition, and a frame information output control step of controlling output of the frame information to be used in the search processing step, wherein the search processing step includes a step of inputting the frame information of different frames to a plurality of comparison units, sequentially reading out N (N is a positive integer: N≤M) pieces of entry information out of M (M is an integer: M≥2) pieces of entry information stored in advance, and causing the plurality of comparison units to perform comparison between the readout entry information and the input frame information at once, and the frame information output control step includes a write step of accumulating, in a frame information buffer, the frame information extracted in the frame information extraction step, and an output processing step of, when triggered by one of a predetermined accumulation count of the frame information and an elapse of a predetermined accumulation time of the frame information in the frame information buffer, distributing a plurality of pieces of frame information accumulated in the frame information buffer to the comparison units to be used in the search processing step one by one.

Effect of the Invention

According to the present invention, triggered by the predetermined accumulation count of the frame information or the elapse of the predetermined accumulation time of the frame information in the frame information buffer, the plurality of pieces of frame information accumulated in the frame information buffer are distributed to the comparison units of the search processing unit one by one. As described above, in the present invention, frame information output control is performed. This makes it possible to shorten the time of access (access count) to the search table necessary for frame information search processing and reduce power consumed by the access to the search table.

BEST MODE FOR CARRYING OUT THE INVENTION

First Embodiment

Figure 1:
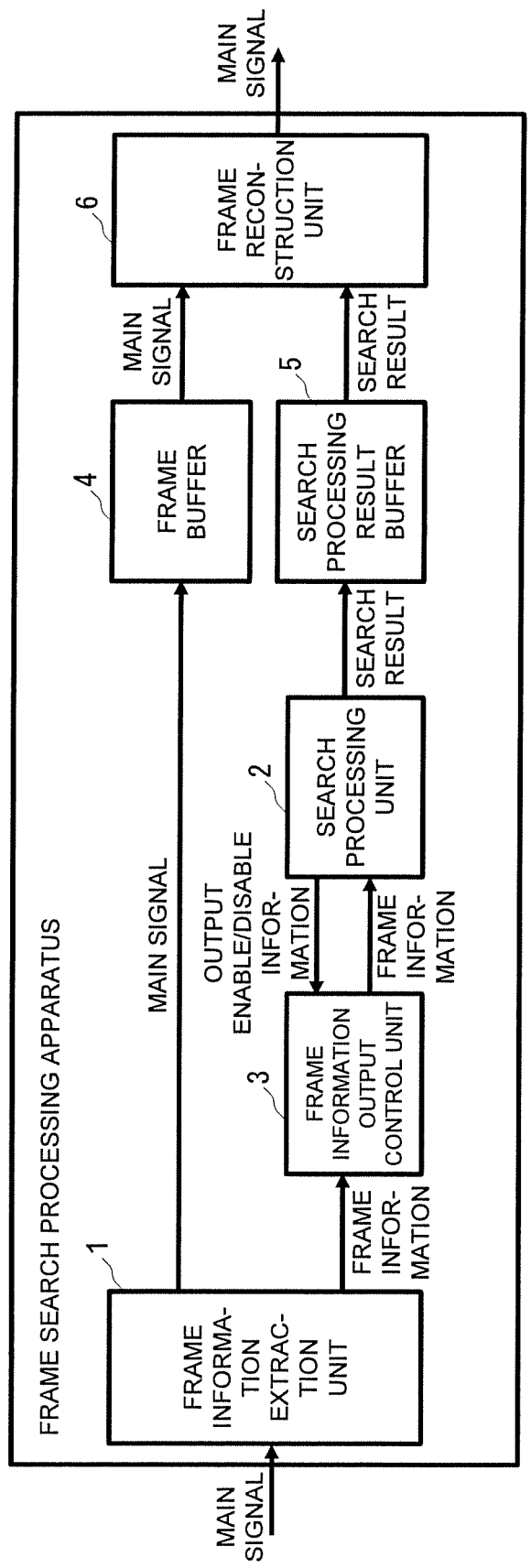
FIG. 1 is a block diagram showing the arrangement of a frame search processing apparatus according to the first embodiment of the present invention.

An embodiment of the present invention will now be described with reference to the accompanying drawings. FIG. 1 is a block diagram showing the arrangement of a frame search processing apparatus according to the first embodiment of the present invention.

The frame search processing apparatus according to this embodiment includes a frame information extraction unit 1 that extracts frame information necessary for frame search processing from an input frame, a search processing unit 2 that searches for frame transfer, discard, or the like based on the extracted frame information, a frame information output control unit 3 that controls output of frame information to the search processing unit 2, a frame buffer 4 that accumulates the data of the input frame during a period until a frame search processing result is obtained, a search processing result buffer 5 that accumulates a search processing result and outputs the search processing result of the input frame to a frame reconstruction unit 6 of the subsequent stage in accordance with a frame output from the frame buffer 4, and the frame reconstruction unit 6 that rewrites the data of the frame output from the frame buffer 4 based on the search processing result output from the search processing result buffer 5.

Note that a search obtained by search processing in the search processing unit 2 need not always be followed by rewrite of frame data. For example, the presence/absence of discard of a frame or a transmission destination may be searched for.

Figure 2:
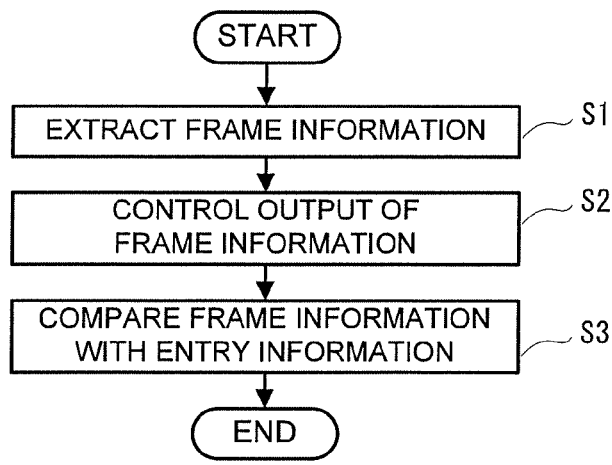
FIG. 2 is a flowchart showing the outline of the operations of a frame information extraction unit, a search processing unit, and a frame information output control unit of the frame search processing apparatus according to the first embodiment of the present invention.

FIG. 2 is a flowchart showing the outline of the operations of the frame information extraction unit 1, the search processing unit 2, and the frame information output control unit 3. The frame information extraction unit 1 extracts frame information (for example, IP address) necessary for frame search processing from an input frame (step S1 of FIG. 2). The frame information output control unit 3 controls output of the frame information to be used by the search processing unit 2 (step S2). The search processing unit 2 compares the frame information with entry information that is a predetermined search condition (step S3).

The frame reconstruction unit 6 rewrites the data of the frame output from the frame buffer 4 based on the search processing result output from the search processing result buffer 5. For example, upon determining based on the search processing result that the frame should be transferred, the frame reconstruction unit 6 rewrites the header information of the frame output from the frame buffer 4 and outputs the frame. Upon determining based on the search processing result that the frame should be discarded, the frame reconstruction unit 6 discards the frame output from the frame buffer 4.

Figure 3:
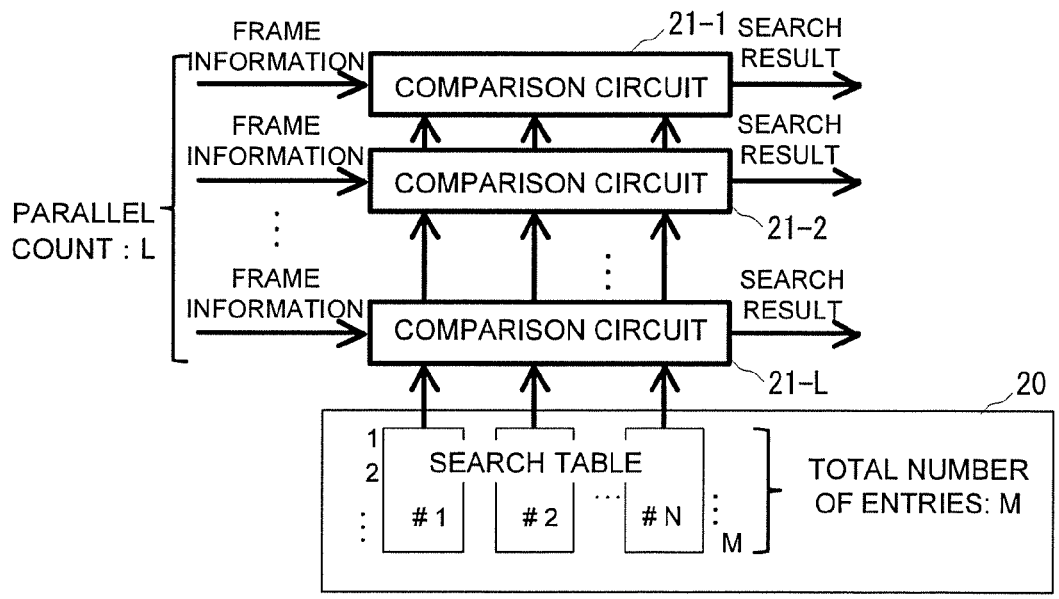
FIG. 3 is a block diagram showing the arrangement of the search processing unit of the frame search processing apparatus according to the first embodiment of the present invention.

The detailed arrangement of the search processing unit 2 will be described next. FIG. 3 is a block diagram showing the arrangement of the search processing unit 2 of the frame search processing apparatus. The search processing unit 2 incorporates a search table 20, and L (L is an integer: L≥2) comparison circuits 21 (21-1, 21-2, . . . , 21-L) each saving as a comparison unit configured to determine whether frame information matches entry information. That is, the search processing unit 2 is formed by parallelly arranging the comparison circuits 21 each configured to do matching determination by comparing frame information with data of the search table 20 such that search processing can be performed simultaneously for a plurality of frames.

M (M is an integer: M≥2) search conditions (entry information) are registered in the search table 20 in advance. When the data of the search table 20 is distributed to the comparison circuits 21, each comparison circuit 21 outputs a search signal representing execution of search processing and an address designation signal, thereby reading out N (N is a positive integer: N≤M) pieces of entry information designated by the address designation signal from the search table 20 in one clock cycle. The pieces of entry information read out from the search table 20 in one clock cycle are sent to all the comparison circuits 21. Note that M/N is preferably an integer, that is, M is preferably a multiple of N.

When no frame information is accumulated, each comparison circuit 21 outputs output enable/disable information representing frame information output enable to the frame information output control unit 3. When frame information is accumulated, each comparison circuit 21 outputs output enable/disable information representing frame information output disable to the frame information output control unit 3. When outputting frame information, the frame information output control unit 3 selects the comparison circuit 21 whose output enable/disable information represents frame information output enable, and outputs the frame information to the selected comparison circuit 21, as will be described later.

Each comparison circuit 21 that has received the frame information from the frame information output control unit 3 compares the frame information with the N pieces of entry information read out from the search table 20 at once. After the comparison, each comparison circuit 21 erases the N pieces of entry information read out from the search table 20, and reads out next N pieces of entry information from the search table 20 in one clock cycle. In this way, each comparison circuit 21 repetitively reads out N pieces of entry information from the search table 20 and compares frame information with them. When comparison between the frame information and all pieces of entry information (M pieces of entry information) of the search table 20 has ended, that is, after the elapse of M/N clock cycles, each comparison circuit 21 outputs the search result (comparison result). After output of the search result, each comparison circuit 21 erases the frame information stored for the search processing to become free.

Figure 4:
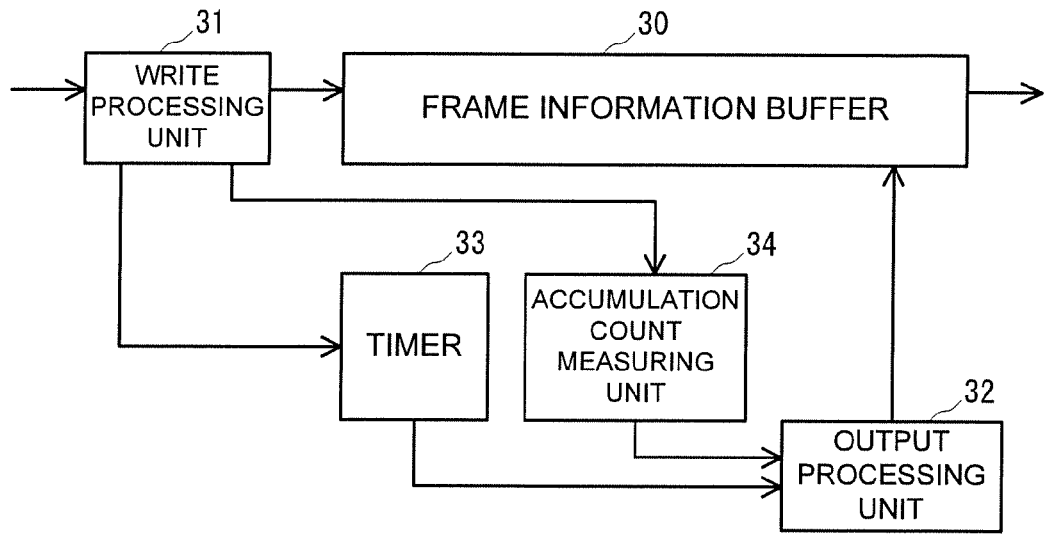
FIG. 4 is a block diagram showing the arrangement of the frame information output control unit of the frame search processing apparatus according to the first embodiment of the present invention.

The basic operation of the frame information output control unit 3 will be described next. FIG. 4 is a block diagram showing the arrangement of the frame information output control unit 3. To control output of frame information to the search processing unit 2, the frame information output control unit 3 includes a frame information buffer 30 that accumulates frame information extracted by the frame information extraction unit 1, a write processing unit 31 that performs write processing of the frame information in the frame information buffer 30, an output processing unit 32 that performs output processing of the frame information to the search processing unit 2, a timer 33, and an accumulation count measuring unit 34. Triggered by a predetermined frame information accumulation count or the elapse of a predetermined frame information accumulation time, the output processing unit 32 outputs a plurality of pieces of frame information accumulated in the frame information buffer 30 to the search processing unit 2.

Note that a predetermined threshold of the frame information accumulation count is preset within the range not more than the number L of comparison circuits 21. The predetermined threshold of the frame information accumulation time is preset in accordance with service requirements.

When triggered by the elapse of a predetermined frame information accumulation time to output frame information to the search processing unit 2, if the frame information accumulation count is smaller than the number of comparison circuits 21, the output processing unit 32 outputs all pieces of frame information accumulated in the frame information buffer 30. If the frame information accumulation count is equal to or larger than the number of comparison circuits 21, the output processing unit 32 outputs frame information as many as the number of comparison circuits 21. The pieces of frame information output to the search processing unit 2 disappear from the frame information buffer 30, as a matter of course. The frame information output control unit 3 also includes the timer 33 that measures the accumulation time of frame information accumulated in the frame information buffer 30 for each frame information, and the accumulation count measuring unit 34 that measures the accumulation count of frame information accumulated in the frame information buffer 30.

Figure 5:
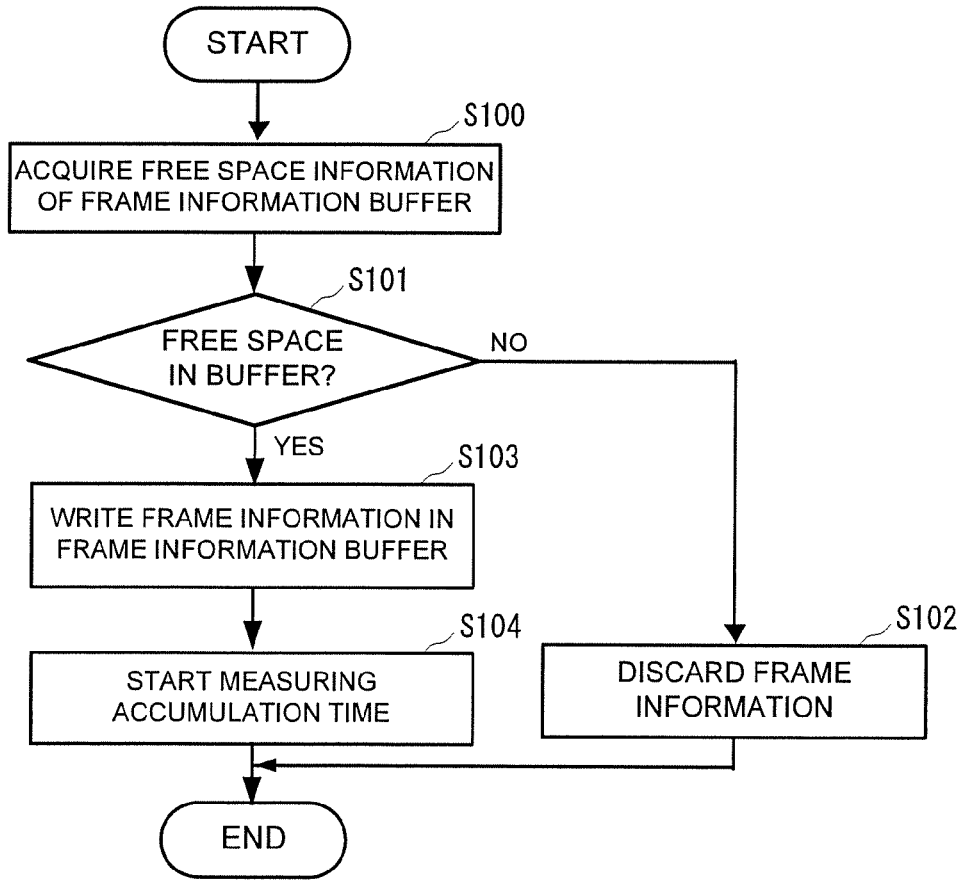
FIG. 5 is a flowchart showing the operation of the write processing unit of the frame information output control unit according to the first embodiment of the present invention when writing frame information in a frame information buffer.

The operation of the frame information output control unit 3 when writing frame information in the frame information buffer 30 will be described next. FIG. 5 is a flowchart showing the operation of the write processing unit 31 of the frame information output control unit 3 when writing frame information in the frame information buffer 30.

Upon receiving frame information from the frame information extraction unit 1, the write processing unit 31 confirms whether the frame information buffer 30 has a free space (steps S100 and S101 of FIG. 5). If the frame information buffer 30 has no free space (NO in step S101), the write processing unit 31 discards the frame information (step S102).

If the frame information buffer 30 has a free space (YES in step S101), the write processing unit 31 write the frame information in the frame information buffer 30 (step S103).

The write processing unit 31 instructs the timer 33 to measure the accumulation time of this frame information, and increments the accumulation count stored in the accumulation count measuring unit 34 by one (step S104). When instructed by the write processing unit 31 to start measuring the accumulation time, the timer 33 sets a predetermined time that is a predetermined threshold as a timer value, and decrements the timer value as the time elapses. In this way, the timer 33 measures, for each frame information, the time elapsed from the start of frame information accumulation.

The write processing unit 31 performs the above-described processing every time frame information is input from the frame information extraction unit 1.

Figure 6:
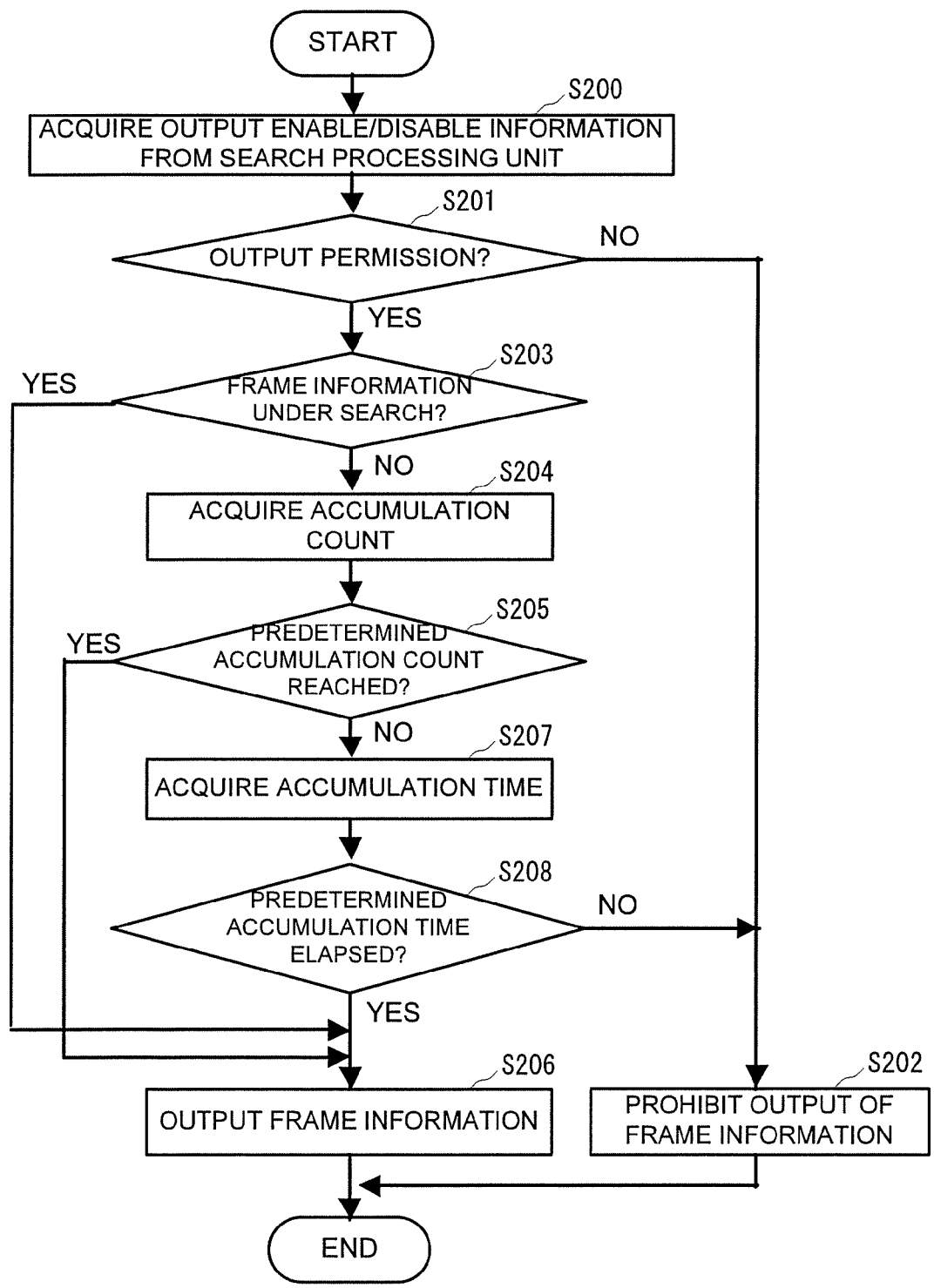
FIG. 6 is a flowchart showing an operation of the output processing unit of the frame information output control unit according to the first embodiment of the present invention when reading out frame information from the frame information buffer and outputting it to the search processing unit.

An operation of the frame information output control unit 3 when reading out frame information from the frame information buffer 30 and outputting it to the search processing unit 2 will be described next. FIG. 6 is a flowchart showing the operation of the output processing unit 32 of the frame information output control unit 3 when reading out frame information from the frame information buffer 30 and outputting it to the search processing unit 2.

To output frame information, an output permission from the search processing unit 2 is necessary, which represents that the search processing unit 2 has a free comparison circuit 21. The output processing unit 32 receives output enable/disable information from the search processing unit 2, and confirms whether there is a free comparison circuit 21 (steps S200 and S201 of FIG. 6).

When the output enable/disable information from the search processing unit 2 represents that all comparison circuits 21 are occupied (NO in step S201), the output processing unit 32 does not output frame information (step S202). When at least one comparison circuit 21 is free (YES in step S201), the output processing unit 32 determines whether there is frame information under search processing in the search processing unit 2 (step S203).

If there is no frame information under search processing in the search processing unit 2 (NO in step S203), the output processing unit 32 acquires the frame information accumulation count from the accumulation count measuring unit 34 (step S204). When the frame information accumulation count in the frame information buffer 30 has reached a predetermined threshold (YES in step S205), the output processing unit 32 reads out frame information from the frame information buffer 30, and outputs it to the search processing unit 2 (step S206).

When the frame information accumulation count in the frame information buffer 30 has not reached the predetermined threshold (NO in step S205), the output processing unit 32 acquires timer values (information representing the accumulation times) from the timer 33 (step S207). If none of frame information accumulation times represented by the timer values has exceeded a predetermined threshold time (NO in step S208), the output processing unit 32 does not output frame information (step S202). When at least one timer value is 0, and at least one piece of frame information whose frame information accumulation time has exceeded the predetermined threshold time exists in the frame information buffer 30 (YES in step S208), the output processing unit 32 reads out frame information from the frame information buffer 30, and outputs it to the search processing unit 2 (step S206).

If there is frame information under search processing in the search processing unit 2, and the plurality of comparison circuits 21 of the search processing unit 2 include a free comparison circuit 21 that is not executing search processing (YES in step S203), the output processing unit 32 reads out frame information from the frame information buffer 30, and outputs it to the comparison circuit 21 of the search processing unit 2, which is not executing search processing, independently of the frame information accumulation count or the elapse of frame information accumulation time (step S206).

When outputting frame information to the search processing unit 2 in step S206, if the frame information accumulation count is smaller than the number of free comparison circuits 21, the output processing unit 32 selects the free comparison circuits 21 as many as the frame information accumulation count, and distributively outputs the pieces of frame information accumulated in the frame information buffer 30 to the selected comparison circuits 21 one by one. If the frame information accumulation count is equal to or larger than the number of free comparison circuits 21, the output processing unit 32 selects the free comparison circuits 21, and distributively outputs frame information as many as the number of free comparison circuits 21 to the selected comparison circuits 21 one by one.

The output processing unit 32 performs the above-described processing for a predetermined output control period. Note that in the frame information output control unit 3, frame information write in the frame information buffer 30 and frame information read for frame information output to the search processing unit 2 are independently executed.

As described above, in this embodiment, frame information output control is executed. This makes it possible to shorten the time of access (count of access) to the search table 20 necessary for frame information search processing and reduce power consumed by access to the search table 20. For example, when the access time or access count halves, power can be reduced by about 3 to 4 W.

Figure 7A:
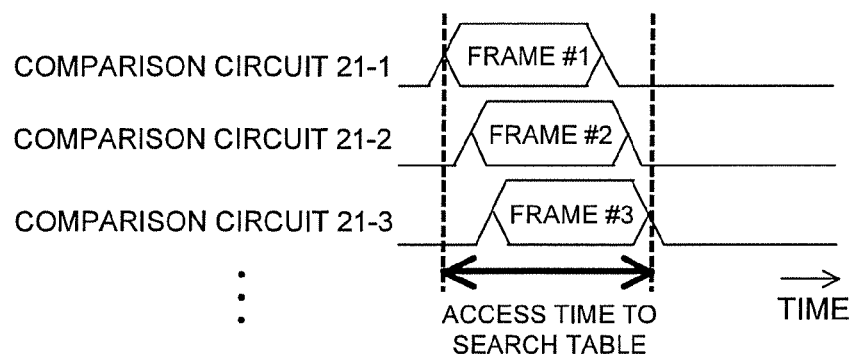
FIGS. 7A and 7B are timing charts showing the fact that the time of access to the search table necessary for frame processing changes depending on the frame information input method.
Figure 7B:
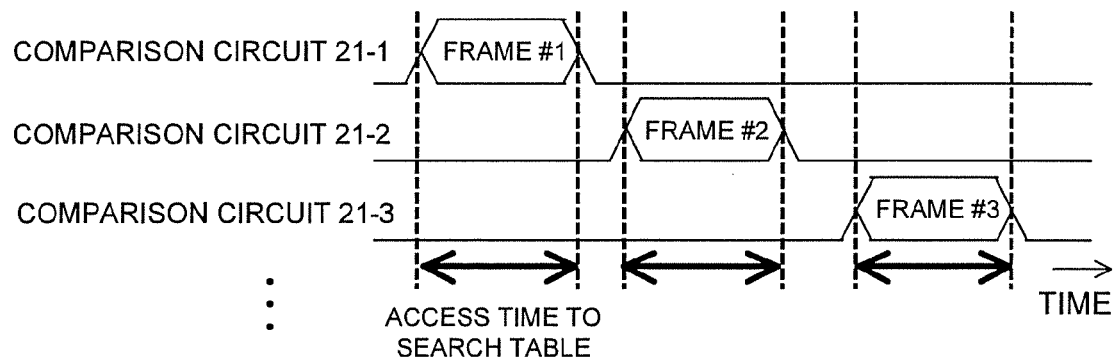

FIGS. 7A and 7B are timing charts showing the fact that the time of access to the search table 20 necessary for frame processing changes depending on the frame information input method. When inputting frame information to the comparison circuits 21 of the search processing unit 2 without intervals, as in this embodiment, the time of access to the search table 20 can be shortened because the plurality of comparison circuits 21 simultaneously execute search processing (FIG. 7A). On the other hand, when sequentially inputting frame information to the comparison circuits 21 at an interval of a predetermined time or more, as in a related art, access to the search table 20 is necessary for search processing of each frame information (FIG. 7B).

Note that the frame information accumulation time measuring method and the output control method by the elapse of a predetermined frame information accumulation time are not limited to those described above. For example, instead of providing the timer 33 used to measure the frame information accumulation time for each accumulated frame information, one timer 33 may be used to execute the measurement. When using one timer 33, the timer 33 starts measuring the frame information accumulation time only when frame information is accumulated in the frame information buffer 30 in a state in which it has a free space. After the start of output to the search processing unit 2, the output processing unit 32 does not suspend output of frame information that is being accumulated or frame information input halfway through output, and outputs these pieces of frame information as soon as a comparison circuit 21 has become free. That is, frame information whose frame information accumulation time is not being measured is prevented from becoming unoutputtable in a state in which a free comparison circuit 21 exists.

Alternatively, instead of using the timer 33, one timepiece may be provided, and the frame arrival time or the start time of frame information accumulation in the frame information buffer 30 may be stored for each frame. That is, the output processing unit 32 may calculate the frame information accumulation time from the current time and the frame arrival time or the start time of frame information accumulation, and perform frame information output control based on the calculated frame information accumulation time.

Note that frames and frame information input in a state in which the frame buffer 4 or the frame information buffer 30 has no free space are discarded without being accumulated.

The frame information output control method is not limited to that described above. For example, the output processing unit 32 may decrease the threshold of the frame information accumulation count that is a frame information output condition by an inverse proportional function or a linear decreasing function in accordance with an increase in the frame information accumulation time.

The output processing unit 32 may change the threshold of the frame information accumulation time that is a frame information output condition in accordance with the frame information accumulation count or the frame accumulation amount of the frame buffer 4. When the frame information accumulation count is large, an effect of shortening the delay of frame output can be obtained by decreasing the threshold of the frame information accumulation time. When the frame accumulation amount of the frame buffer 4 is large, an effect of preventing overflow of the frame buffer 4 can be obtained by decreasing the threshold of the frame information accumulation time.

Figure 8:
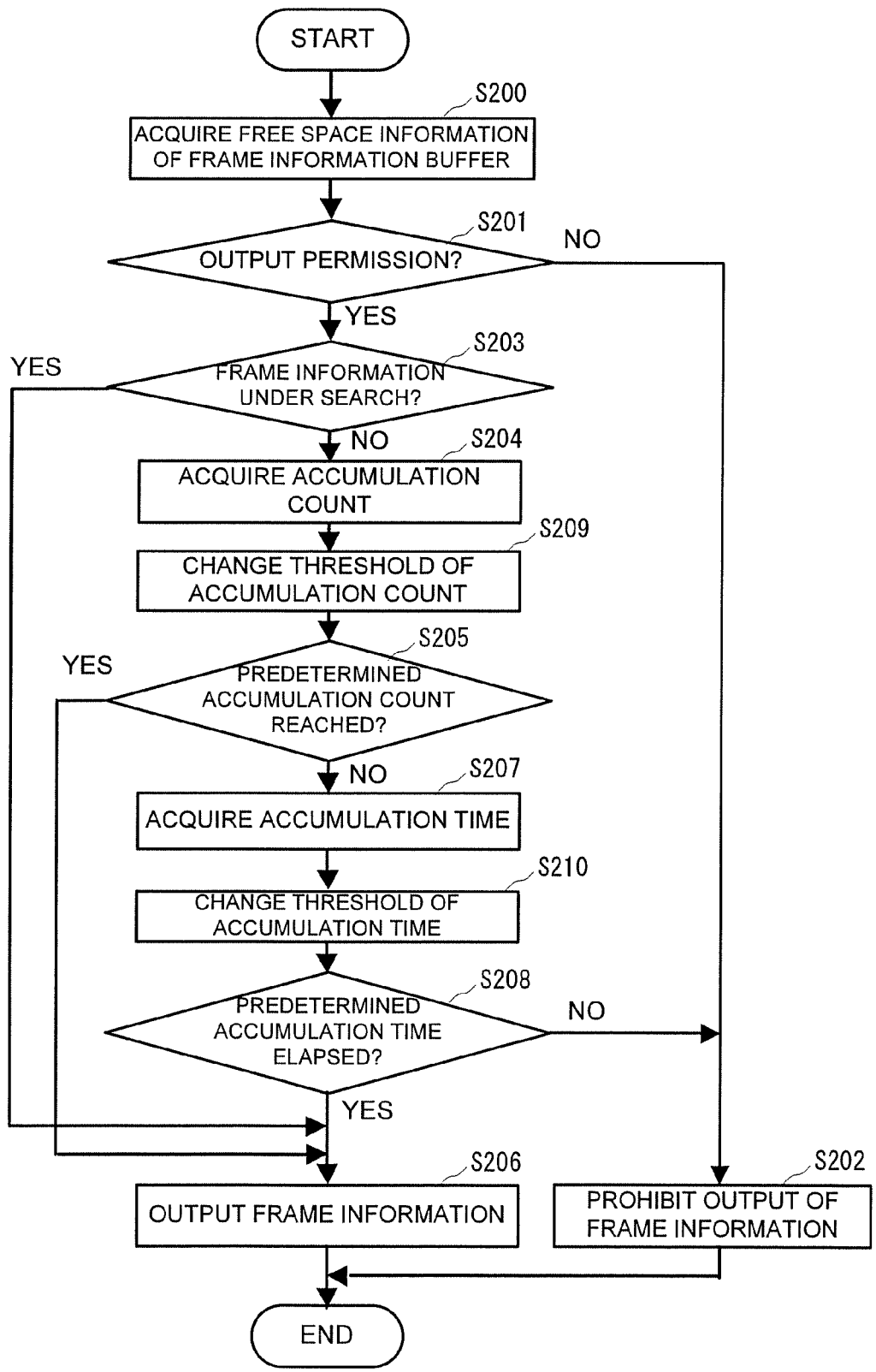
FIG. 8 is a flowchart showing another operation of the output processing unit of the frame information output control unit according to the first embodiment of the present invention when reading out frame information from the frame information buffer and outputting it to the search processing unit.

FIG. 8 is a flowchart showing the operation of the output processing unit 32 of the frame information output control unit 3 when changing the threshold. As described above, the output processing unit 32 decreases the threshold of the frame information accumulation count to be used in the determination of step S205 by an inverse proportional function or a linear decreasing function in accordance with an increase in the frame information accumulation time (step S209 of FIG. 8). In addition, the output processing unit 32 decreases the threshold time of the frame information accumulation time to be used in the determination of step S208 by an inverse proportional function or a linear decreasing function in accordance with an increase in the frame information accumulation count or an increase in the frame accumulation amount of the frame buffer 4 (step S210 of FIG. 8). The remaining processes of FIG. 8 are the same as described with reference to FIG. 6. Note that in the example of FIG. 8, the threshold of the frame information accumulation count is changed at the timing between step S204 and step S205, and the threshold time of the frame information accumulation time is changed at the timing between step S207 and step S208. However, the present invention is not limited to this, and the thresholds may be changed at another timing.

Figure 9:
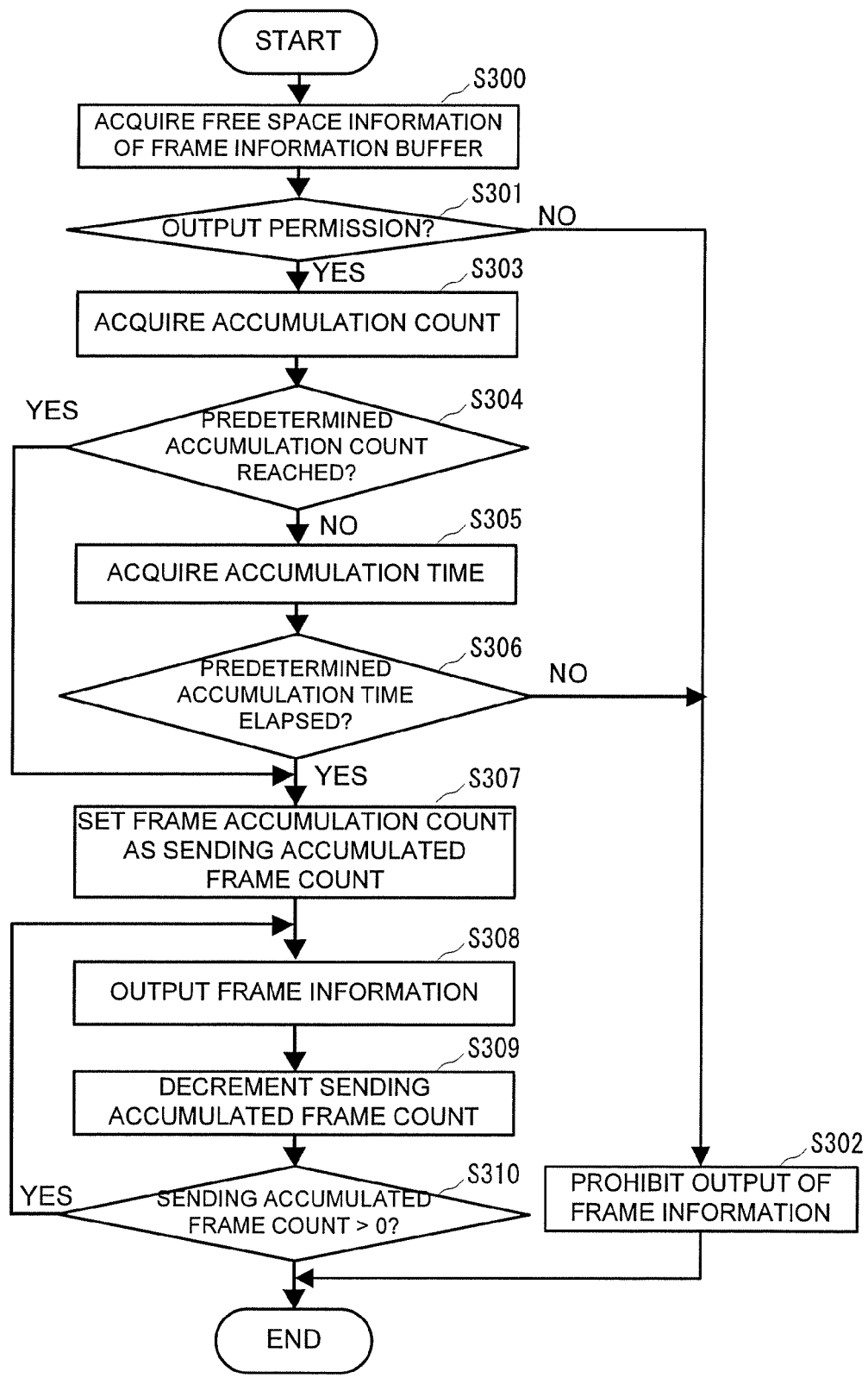
FIG. 9 is a flowchart showing still another operation of the output processing unit of the frame information output control unit according to the first embodiment of the present invention when reading out frame information from the frame information buffer and outputting it to the search processing unit.

Also usable is an output method of outputting frame information as many as there are accumulated, and keeping frame information, which is newly input during output of the frame information, accumulated without being output until the output condition is met again. FIG. 9 is a flowchart showing the operation of the output processing unit 32 of the frame information output control unit 3 in this case.

Operations of steps S300, S301, and S302 of FIG. 9 are the same as in steps S200, S201, and S202 of FIG. 6, respectively, and a description thereof will be omitted.

The output processing unit 32 confirms the output enable/disable information from the search processing unit 2. When at least one comparison circuit 21 is free (YES ins step S301), the output processing unit 32 acquires the frame information accumulation count from the accumulation count measuring unit 34 (step S303). When the frame information accumulation count in the frame information buffer 30 has reached a predetermined threshold (YES in step S304), the output processing unit 32 advances to step S307. When the frame information accumulation count has not reached the predetermined threshold (NO in step S304), the output processing unit 32 acquires timer values (information representing the accumulation times) from the timer 33 (step S305). If none of frame information accumulation times represented by the timer values has exceeded a predetermined threshold time (NO in step S306), the output processing unit 32 does not output frame information (step S302).

When the frame information accumulation count in the frame information buffer 30 has reached the predetermined threshold (YES in step S304), or when at least one timer value is 0, and at least one piece of frame information whose frame information accumulation time has exceeded the predetermined threshold time exists in the frame information buffer 30 (YES in step S306), the output processing unit 32 sets the frame information accumulation count as a sending accumulated frame count (step S307). The output processing unit 32 reads out the frame information from the frame information buffer 30, outputs them to the search processing unit 2 (step S308), and decrements the sending accumulated frame count by the number of output frame information (step S309). The processes of steps S308 and S309 are repetitively performed until the sending accumulated frame count becomes 0 (NO in step S310).

This operation is different from the output operation as the base of this embodiment shown in FIG. 6 in that the frame information accumulation count acquired in advance is set as the sending accumulated frame count before output of frame information, and only pieces of frame information as many as the sending accumulated frame count are output to the search processing unit 2. At this time, after output of the frame information, the value of the sending accumulated frame count is decremented. If the sending accumulated frame count is larger than 0, the process returns to output of frame information. If the sending accumulated frame count is 0 or less, the output operation ends. Only pieces of frame information as many as the set sending accumulated frame count are output in the above-described way. Even when pieces of frame information are continuously input, the plurality of pieces of frame information can be output together. Hence, a power saving effect can be obtained.

An example in which a frame passes through the frame search processing apparatus and the frame information extraction unit 1 has been described above. However, the present invention is not limited to this arrangement. For example, frame search processing may be performed by extracting frame information from a frame accumulated in the frame buffer, instead of making a frame pass through the frame search processing apparatus and the frame information extraction unit 1.

The effects of this embodiment will be described using mathematical expressions. Let Ff be the number of frames input per unit time, Ts be the time necessary to search for one frame, Nt be the count of reading the table when searching for a frame, Nr be the count of reading the table per unit time, Nc be the number (degree of parallelism) of comparison circuits, and Tw be the predetermined accumulation time (waiting time from the immediately preceding search to the next search). In the conventional method, Nr is expressed as follows. Note that when simultaneously searching for a plurality of frames, that is, when performing a parallel operation, memory access need not be performed for each frame because search conditions read out by one memory access are distributed to all comparison circuits.

```
if 1/Ff > Ts then Nr = Ff*Nt
else Nr = 1/Ts*Nt
endif
```

That is, when 1/Ff>Ts (when no parallel operation is performed, and a table read stop period exists), Nr is Ff*Nt. When 1/Ff≤Ts (when a parallel operation is performed, and continuous table read is performed), Nr is 1/Ts*Nt. However, when the maximum value of Ff (when frames having the minimum frame length are input at the minimum interframe gap) is Ffmax, Nc≥Ts*Ffmax.

On the other hand, in this embodiment, the timer that starts at the start of a search is implemented. Frames input from the end of the search to the timeout of the timer are temporarily accumulated in the buffer. Upon timeout, the accumulated frames are searched for at once. After the end of the search, the timer is restarted. However, when Nc frames are input before the timeout of the timer, the accumulated frames are searched for at once, and the timer is restarted. In this case, Nr is given by

```
if 1/Ff > Tw then Nr = Ff*Nt
else if 2/Ff > Tw then Nr = Ff*Nt/2
else if 3/Ff > Tw then Nr = Ff*Nt/3
...
else if Nc/Ff > Tw then Nr = Ff*Nt/Nc
else Nr = Ff*Nt/Nc
endif
```

That is, in this embodiment, when 1/Ff>Tw (when the search is executed in a state in which one frame is accumulated upon timeout of the timer), Nr is Ff*Nt. When 2/Ff≤Tw (when the search is executed in a state in which two frames are accumulated upon timeout of the timer), Nr is Ff*Nt/2. When 3/Ff>Tw, (when the search is executed in a state in which three frames are accumulated upon timeout of the timer), Nr is Ff*Nt/3. When Nc/Ff>Tw, (when the search is executed in a state in which Nc frames are accumulated upon timeout of the timer), or when the search is executed in a state in which three frames are accumulated before timeout of the timer, Nr is Ff*Nt/Nc.

Note that when the upper limit of Ff of this embodiment=Nc/Ts, and the condition (Nc≥Ts*Ffmax) for Nc of the conventional arrangement is met, the upper limit of Ff of this embodiment=Ffmax. For example, Nc=Ts*Ffmax, and Ff=Ffmax, Nr has the same value as in the conventional arrangement.

Second Embodiment

Figure 10:
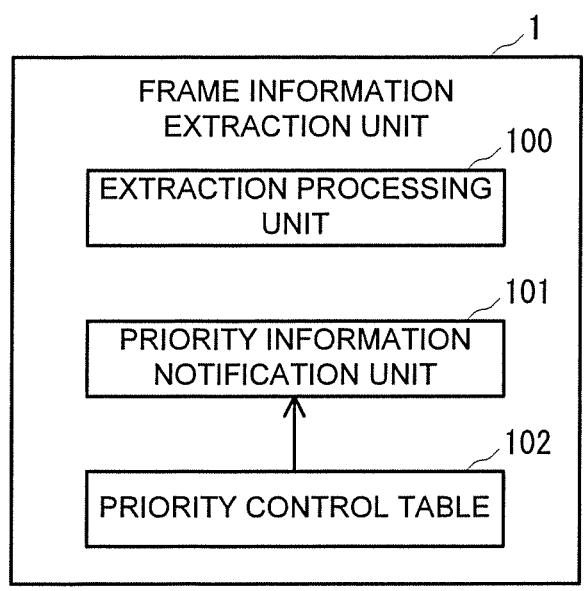
FIG. 10 is a block diagram showing the arrangement of a frame information extraction unit of a frame search processing apparatus according to the second embodiment of the present invention.

The second embodiment of the present invention will be described next. In this embodiment as well, the overall arrangement of a frame search processing apparatus is the same as in the first embodiment and will be described using the reference numerals in FIG. 1. FIG. 10 is a block diagram showing the arrangement of a frame information extraction unit 1 according to this embodiment. The frame information extraction unit 1 according to this embodiment includes an extraction processing unit 100 that extracts frame information necessary for frame search processing from an input frame, a priority information notification unit 101, and a priority control table 102.

The arrangement shown in FIG. 10 is an apparatus arrangement configured to grasp the priority of each frame in advance. Unlike the first embodiment, a search of the priority of each frame is executed before frame information is input to a frame information output control unit 3, and the obtained priority information of each frame is used for frame information output control.

Figure 11:
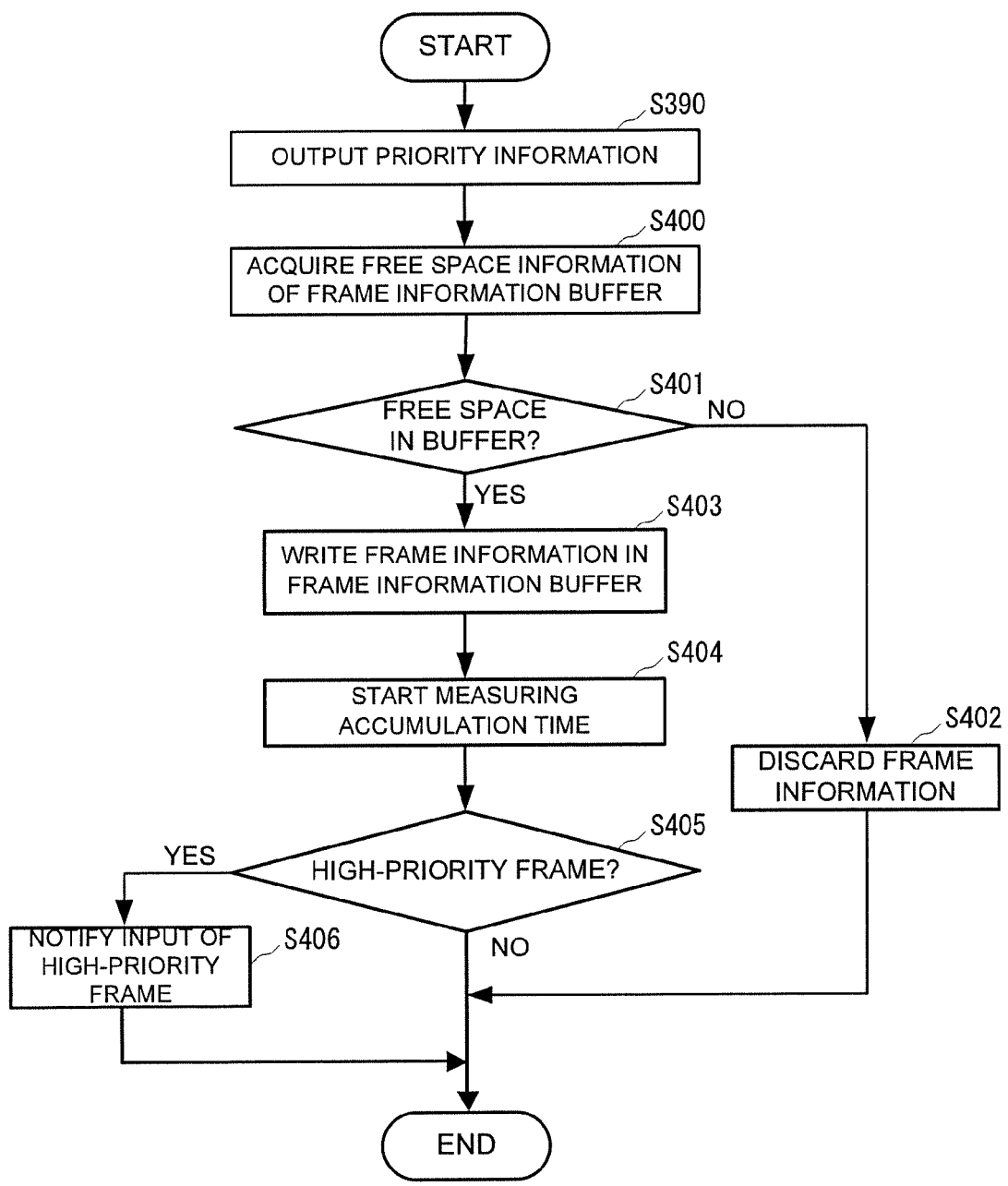
FIG. 11 is a flowchart showing the operation of a priority information notification unit of the frame information extraction unit according to the second embodiment of the present invention and an operation of a write processing unit of the frame information output control unit when writing frame information in a frame information buffer.

The operation of the frame information output control unit 3 when writing frame information in a frame information buffer 30 will be described next. FIG. 11 is a flowchart showing the operation of the priority information notification unit 101 of the frame information extraction unit 1 and the operation of a write processing unit 31 of the frame information output control unit 3 when writing frame information in the frame information buffer 30.

When a frame is input to the frame information extraction unit 1, the priority information notification unit 101 of the frame information extraction unit 1 searches for the priority of the input frame by, for example, referring to information recorded in the priority control table 102 in advance, and outputs priority information representing the priority of the frame to the frame information output control unit 3 at the same time as the output of frame information extracted from the input frame (step S390 of FIG. 11).

Operations of steps S400, S401, S402, S403, and S404 of FIG. 11 are the same as in steps S100, S101, S102, S103, and S104 of FIG. 5, respectively, and a description thereof will be omitted.

Upon confirming the priority information received from the priority information notification unit 101 and recognizing that a high-priority frame is input (YES in step S405 of FIG. 11), the write processing unit 31 of the frame information output control unit 3 notifies an output processing unit 32 of the input of the high-priority frame (step S406).

Note that in FIG. 11, frames and frame information input in a state in which the frame information buffer 30 has no free space are discarded. However, thresholds may be set for each of high- and low-priority frames, so that frames are discarded when the total amount of input frames and frame information has reached a predetermined amount even if the buffer has a free space. For example, when the amount of high-priority frames input per unit time is known, the discard threshold of the low-priority frame is set to be lower that that of the high-priority frame by an amount corresponding to the product of the above amount and a time probably needed until processing of the frame search processing apparatus according to this embodiment. This can prevent high-priority frames from being discarded.

Buffer amounts that the high-priority frames and low-priority frames can occupy may be determined in advance. For example, the product of the amount of high-priority frames input per unit time and a time probably needed until processing of the frame search processing apparatus according to this embodiment is set as the buffer amount that the low-priority frames can occupy.

Figure 12:
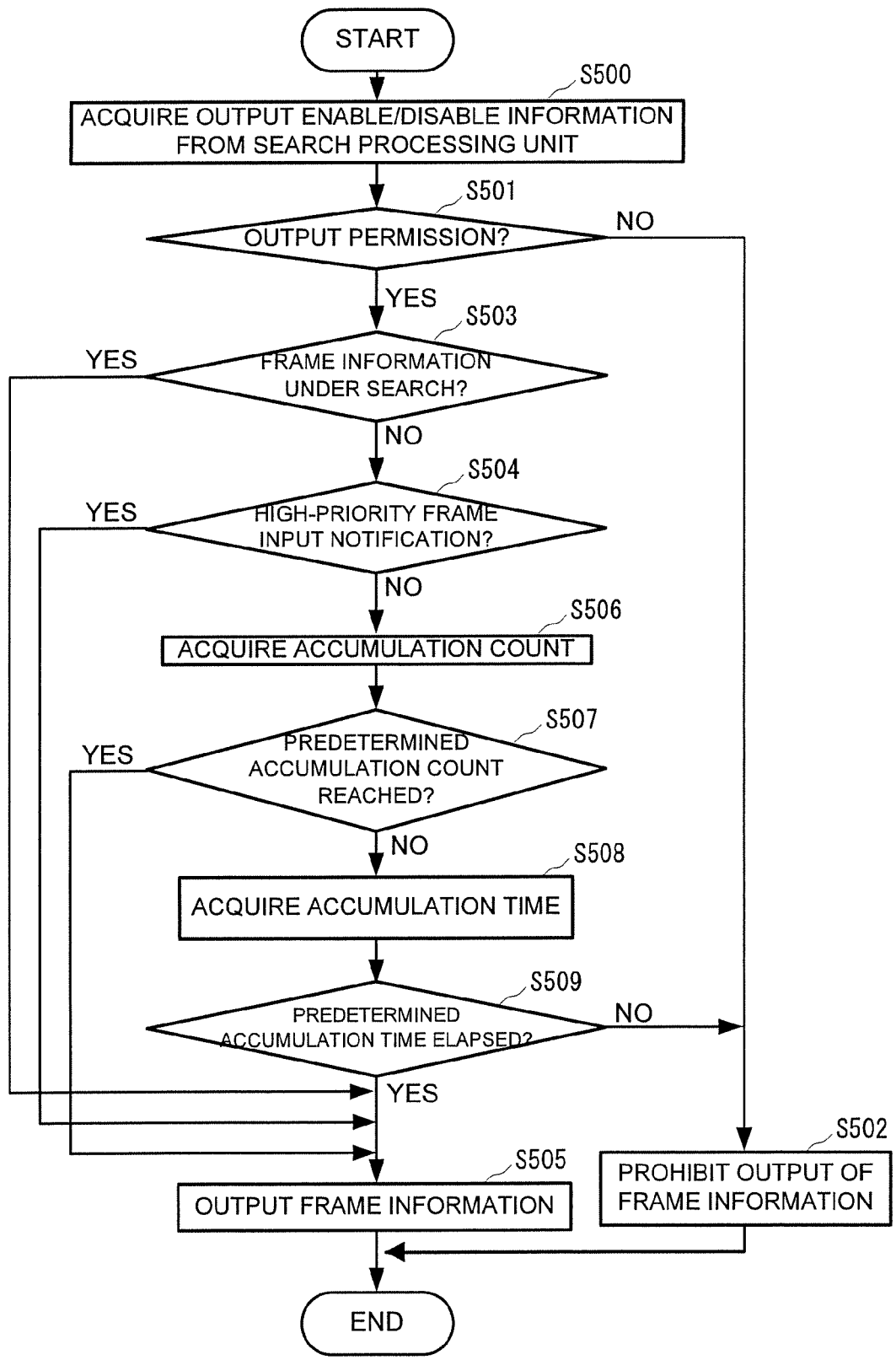
FIG. 12 is a flowchart showing an operation of the output processing unit of the frame information output control unit according to the second embodiment of the present invention when reading out frame information from the frame information buffer and outputting it to the search processing unit.

The operation of the frame information output control unit 3 when reading out frame information from the frame information buffer 30 and outputting it to a search processing unit 2 will be described next. FIG. 12 is a flowchart showing the operation of the output processing unit 32 of the frame information output control unit 3 when reading out frame information from the frame information buffer 30 and outputting it to the search processing unit 2.

Operations of steps S500, S501, S502, and S503 of FIG. 12 are the same as in steps S200, S201, S202, and S203 of FIG. 6, respectively, and a description thereof will be omitted.

This operation is different from the first embodiment in the output method when a high-priority frame input notification is received. When a notification representing that a high-priority frame is input is received (YES ins step S504 of FIG. 12), and at least one comparison circuit 21 is free (YES in step S501), the output processing unit 32 of the frame information output control unit 3 reads out frame information from the frame information buffer 30 and outputs it to the search processing unit 2 independently of the frame information accumulation count or the elapse of the frame information accumulation time (step S502).

When no notification representing that a high-priority frame is input is received (NO ins step S504), the output processing unit 32 acquires the frame information accumulation count from an accumulation count measuring unit 34 (step S506).

Operations of steps S507, S508, and S509 of FIG. 12 are the same as in steps S205, S207, and S208 of FIG. 6, respectively, and a description thereof will be omitted.

As in the first embodiment, if there is frame information under search processing in the search processing unit 2, and the comparison circuits 21 of the search processing unit 2 include a free comparison circuit 21 that is not executing search processing (YES in step S503), the output processing unit 32 reads out frame information from the frame information buffer 30, and outputs it to the comparison circuit 21 of the search processing unit 2, which is not executing search processing, independently of the frame information accumulation count or the elapse of frame information accumulation time (step S505).

When outputting frame information to the search processing unit 2 in step S505, if the frame information accumulation count is smaller than the number of free comparison circuits 21, the output processing unit 32 selects the free comparison circuits 21 as many as the frame information accumulation count, and distributively outputs the pieces of frame information accumulated in the frame information buffer 30 to the selected comparison circuits 21 one by one. If the frame information accumulation count is equal to or larger than the number of free comparison circuits 21, the output processing unit 32 selects the free comparison circuits 21, and distributively outputs frame information as many as the number of free comparison circuits 21 to the selected comparison circuits 21 one by one.

The output processing unit 32 performs the above-described processing for a predetermined output control period.

As described above, in this embodiment, the high-priority frame input notification is added to the output conditions, thereby shortening the delay of a high-priority frame that is required to have a short delay.

Note that the frame information output control method when the priority information of a frame is grasped in advance is not limited to the above method. For example, the output processing unit 32 may change the threshold of the frame information accumulation count that is a frame information output condition in accordance with the priority of an accumulated frame. In this case, a threshold corresponding to a frame having the highest priority out of a plurality of frames accumulated in a frame buffer 4 is set. At this time, the higher the priority of the frame is, the smaller the threshold of the frame information accumulation count set by the output processing unit 32 is.

Alternatively, the output processing unit 32 may change the threshold of the frame information accumulation time that is a frame information output condition in accordance with the priority of an accumulated frame. In this case, a threshold corresponding to a frame having the highest priority out of a plurality of frames accumulated in the frame buffer 4 is set. At this time, the higher the priority of the frame is, the smaller the threshold of the frame information accumulation time set by the output processing unit 32 is.

Figure 13:
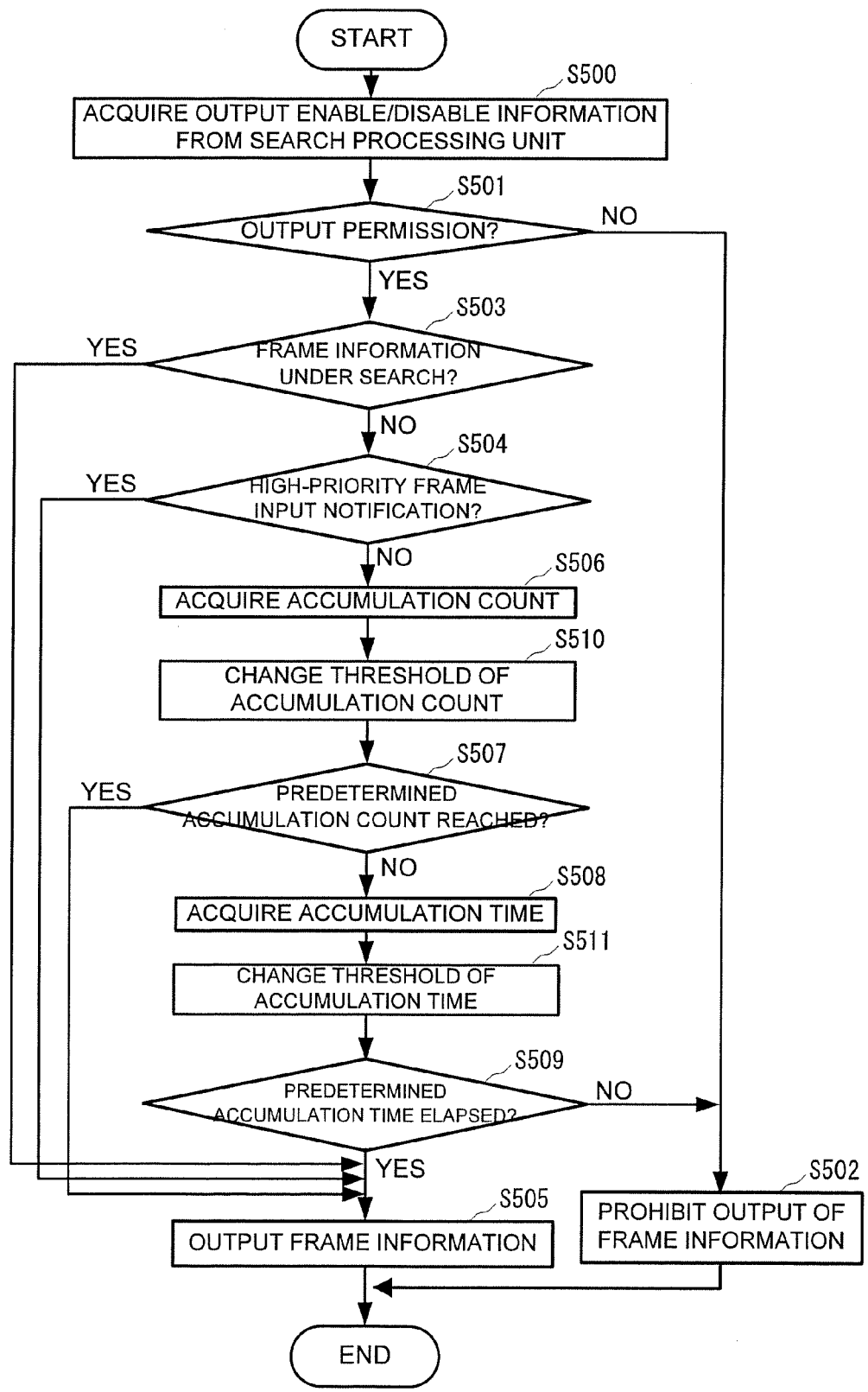
FIG. 13 is a flowchart showing another operation of the output processing unit of the frame information output control unit according to the second embodiment of the present invention when reading out frame information from the frame information buffer and outputting it to the search processing unit.

FIG. 13 is a flowchart showing the operation of the output processing unit 32 of the frame information output control unit 3 when changing the threshold. As described above, the output processing unit 32 changes the threshold of the frame information accumulation count to be used in the determination of step S507 in accordance with the priority of a frame (step S510 of FIG. 13). In addition, the output processing unit 32 changes the threshold time of the frame information accumulation time to be used in the determination of step S509 in accordance with the priority of a frame (step S511 of FIG. 13). The remaining processes of FIG. 13 are the same as described with reference to FIG. 12. In the example of FIG. 13, the threshold of the frame information accumulation count is changed at the timing between step S506 and step S507, and the threshold time of the frame information accumulation time is changed at the timing between step S508 and step S509. However, the present invention is not limited to this, and the thresholds may be changed at another timing.

Note that the frame information output control method according to this embodiment described with reference to FIG. 12 corresponds to an operation of changing the threshold of the frame information accumulation count and the threshold of the frame information accumulation time to the minimum value (that is, zero) upon receiving a high-priority frame input notification.

Otherwise, the frame information buffer 30 may be provided for each frame priority. When accumulating frame information for each frame priority, the threshold of the frame information accumulation count and the threshold of the frame information accumulation time may be changed in accordance with the priority of a frame. At this time, the higher the priority of the frame is, the smaller the threshold of the frame information accumulation time set by the output processing unit 32 is.

An example in which a frame passes through the frame search processing apparatus and the frame information extraction unit 1 has been described above. However, the present invention is not limited to this arrangement. For example, frame search processing may be performed by extracting frame information from a frame accumulated in the frame buffer, instead of making a frame pass through the frame search processing apparatus and the frame information extraction unit 1.

Third Embodiment

Figure 14:
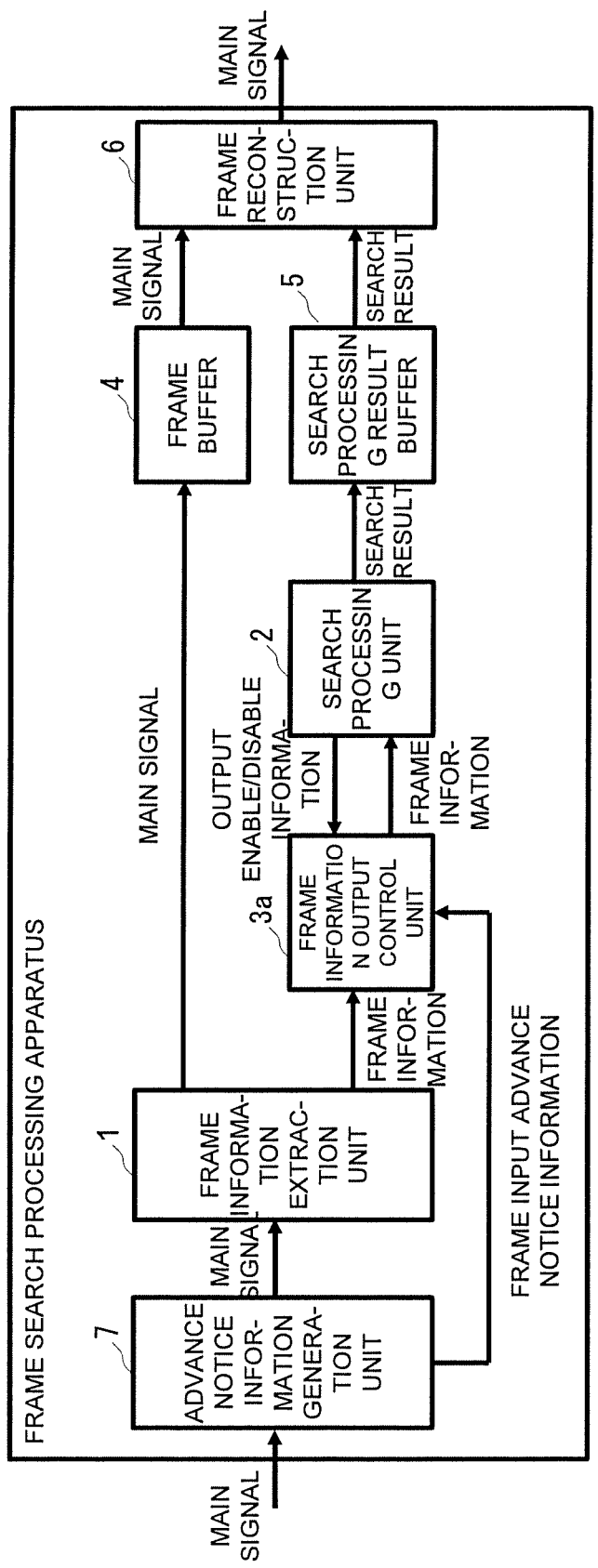
FIG. 14 is a block diagram showing the arrangement of a frame search processing apparatus according to the third embodiment of the present invention.

The third embodiment of the present invention will be described next. FIG. 14 is a block diagram showing the arrangement of a frame search processing apparatus according to the third embodiment of the present invention.

The frame search processing apparatus according to this embodiment includes a frame information extraction unit 1, a search processing unit 2, a frame information output control unit 3a, a frame buffer 4, a search processing result buffer 5, a frame reconstruction unit 6, and an advance notice information generation unit 7. The schematic internal arrangement of the frame information output control unit 3a is the same as in the first embodiment and will be described using the reference numerals in FIG. 4.

Figure 15:
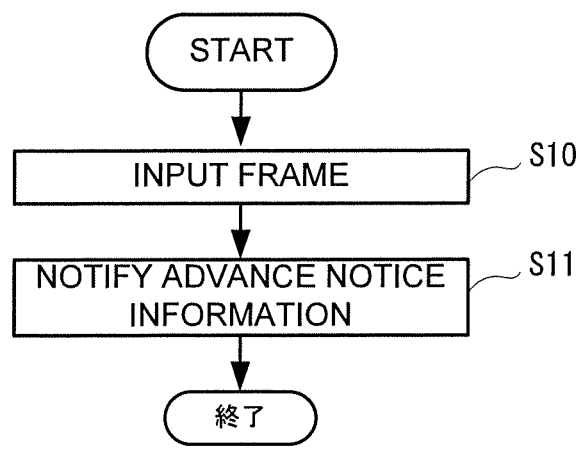
FIG. 15 is a flowchart showing the operation of an advance notice information generation unit of the frame search processing apparatus according to the third embodiment of the present invention.

This embodiment is different from the first embodiment in that the advance notice information generation unit 7 for frame input, which notifies the frame information output control unit 3a that a frame has been input to the frame search processing apparatus as advance notice information, is provided. FIG. 15 is a flowchart showing the operation of the advance notice information generation unit 7. When a frame is input (step S10 of FIG. 15), the advance notice information generation unit 7 notifies the frame information output control unit 3a that frame information is to be input within a predetermined elapsed time (step S11).

That is, the frame information output control unit 3a can grasp in advance that there is a frame that has been input to the frame search processing apparatus but not yet arrived at the frame information output control unit 3a. Upon determining based on the advance notice information that the frame information is not input to the frame information output control unit 3a within the predetermined elapsed time, the frame information output control unit 3a outputs the accumulated frame information to the search processing unit 2 without waiting for the elapse of a predetermined frame information accumulation time.

Even if the predetermined frame information accumulation time has elapsed, only when frame information is known to be input to the frame information output control unit 3a within a predetermined elapsed time, the frame information output control unit 3a continues frame information accumulation and, in accordance with arrival of subsequent frame information, outputs the accumulated frame information to the search processing unit 2. The threshold of the frame information accumulation time is preset by inverse calculation from the predetermined elapsed time. For example, the threshold of the frame information accumulation time is set to be shorter than the predetermined elapsed time. Note that the advance notice information generation unit 7 may be arranged outside the frame search processing apparatus.

Figure 16:
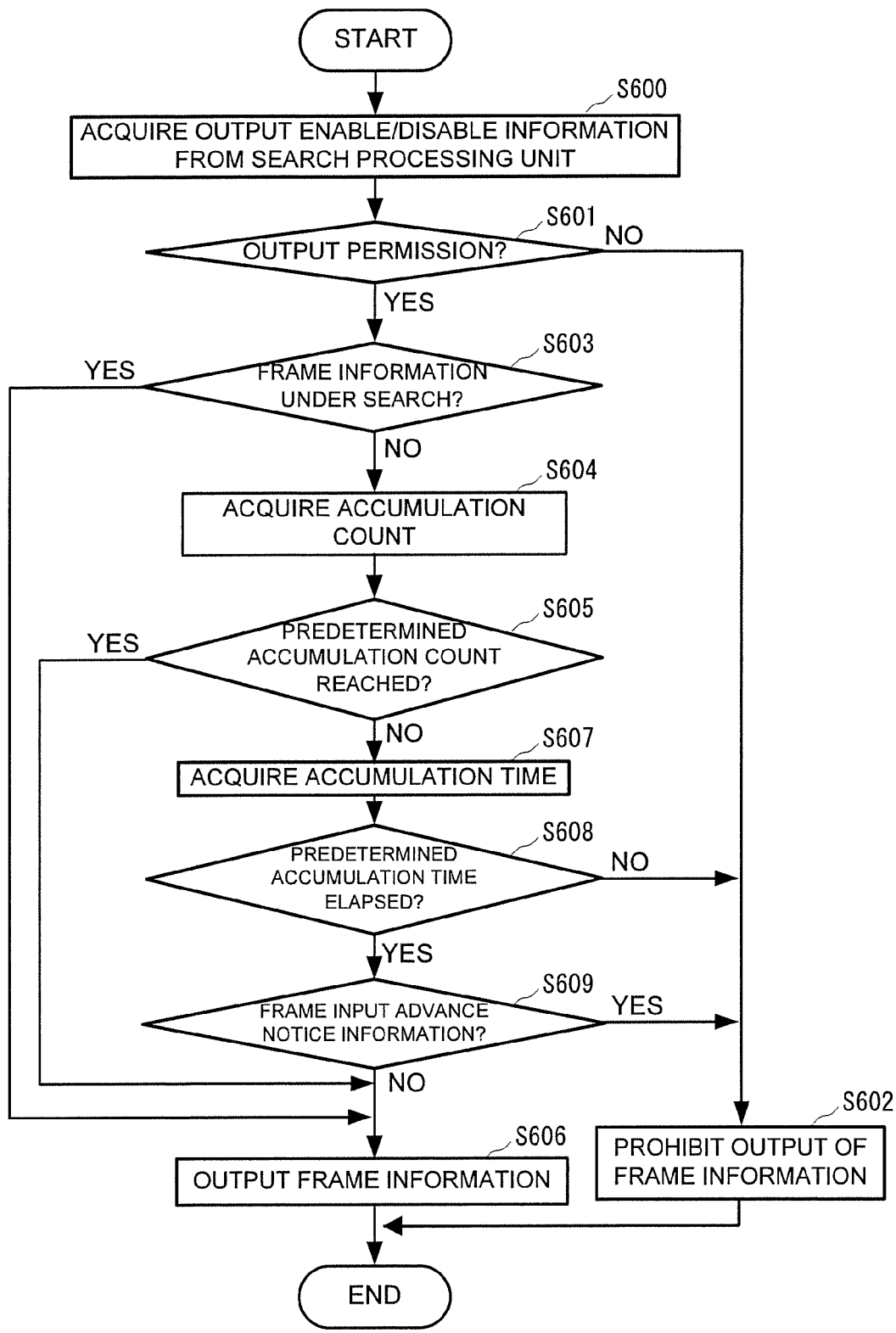
FIG. 16 is a flowchart showing the operation of the output processing unit of the frame information output control unit according to the third embodiment of the present invention when reading out frame information from a frame information buffer and outputting it to a search processing unit.

The operation of the frame information output control unit 3a when reading out frame information from a frame information buffer 30 and outputting it to the search processing unit 2 will be described next. FIG. 16 is a flowchart showing the operation of an output processing unit 32 of the frame information output control unit 3a when reading out frame information from the frame information buffer 30 and outputting it to the search processing unit 2.

Operations of steps S600, S601, S602, S603, S604, S605, S606, S607, and S608 of FIG. 16 are the same as in steps S200, S201, S202, S203, S204, S205, S206, S207, and S208 of FIG. 6, respectively, and a description thereof will be omitted.

When at least one timer value is 0, and at least one piece of frame information whose frame information accumulation time has exceeded a predetermined threshold time exists in the frame information buffer 30 (YES in step S608), and when frame information is known to be input to the frame information output control unit 3a within a predetermined elapsed time upon confirming the advance notice information (YES in step S609), the output processing unit 32 of the frame information output control unit 3a does not output frame information (step S602). Upon determining that no frame information is to be input to the frame information output control unit 3a within a predetermined elapsed time (NO in step S609), the output processing unit 32 reads out frame information from the frame information buffer 30, and outputs it to the search processing unit 2 (step S606).

As described above, even after the elapse of the predetermined frame information accumulation time, when it can be determined based on the advance notice information that no subsequent frame information is to be input, frame information is output to the search processing unit 2 independently of the frame information accumulation count or the elapse of the frame information accumulation time, unlike the first embodiment.

If there is frame information under search processing in the search processing unit 2, and comparison circuits 21 of the search processing unit 2 include a free comparison circuit 21 that is not executing search processing (YES in step S603), the output processing unit 32 reads out frame information from the frame information buffer 30, and outputs it to the comparison circuit 21 of the search processing unit 2, which is not executing search processing, independently of the frame information accumulation count or the elapse of frame information accumulation time (step S606), as in the first embodiment.

The output processing unit 32 performs the above-described processing for a predetermined output control period.

Note that the operation of a write processing unit 31 of the frame information output control unit 3a when writing frame information in the frame information buffer 30 is the same as in the first embodiment.

Frames and frame information input in a state in which the frame buffer 4 or the frame information buffer 30 has no free space are discarded without being accumulated.

As described above, in this embodiment, the advance notice information of frame information input is added to the output conditions, thereby shortening the delay time of frame output. In addition, a plurality of frames are continuously output to the search processing unit 2, thereby shortening the time of access to a search table 20 and reducing power consumption.

Note that the output control execution method using the advance notice information of frame input is not limited to the above method. For example, the output processing unit 32 may set a short threshold of the frame information accumulation time in advance, and when frame information is known to be input to the frame information output control unit 3a within a predetermined elapsed time, prolong the threshold of the frame information accumulation time.

The output processing unit 32 may calculate the number of frame information to be input to the frame information output control unit 3a within a predetermined elapsed time, and decrease the threshold of the frame information accumulation time in accordance with the obtained number of frames.

An example in which a frame passes through the frame search processing apparatus and the frame information extraction unit 1 has been described above. However, the present invention is not limited to this arrangement. For example, frame search processing may be performed by extracting frame information from a frame accumulated in the frame buffer, instead of making a frame pass through the frame search processing apparatus and the frame information extraction unit 1.

Fourth Embodiment

Figure 17:
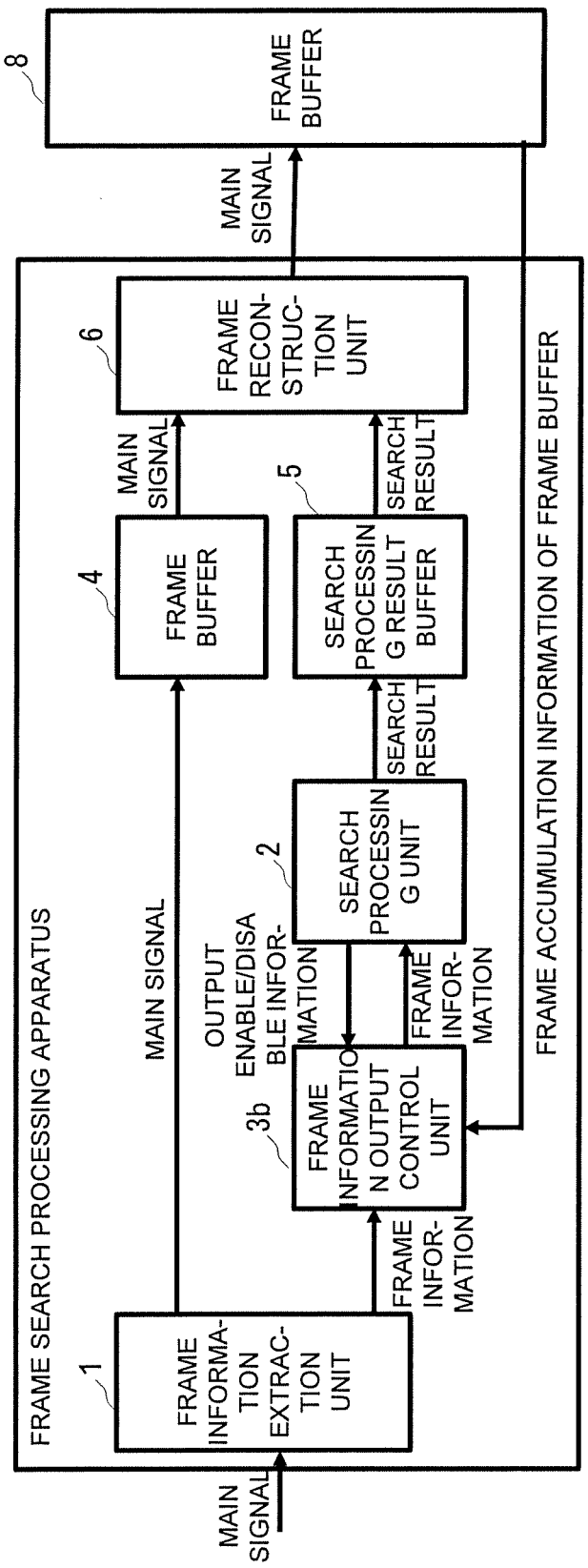
FIG. 17 is a block diagram showing the arrangement of a frame search processing apparatus according to the fourth embodiment of the present invention.

The fourth embodiment of the present invention will be described next. FIG. 17 is a block diagram showing the arrangement of a frame search processing apparatus according to the fourth embodiment of the present invention.

The frame search processing apparatus according to this embodiment includes a frame information extraction unit 1, a search processing unit 2, a frame information output control unit 3b, a frame buffer 4, a search processing result buffer 5, and a frame reconstruction unit 6. The schematic internal arrangement of the frame information output control unit 3b is the same as in the first embodiment and will be described using the reference numerals in FIG. 4.

This embodiment is different from the first embodiment in that when frame accumulation information of a frame buffer 8 connected to the subsequent stage of the frame search processing apparatus is acquired, and frames are accumulated in the frame buffer 8, the frame information output control unit 3b accumulates frame information corresponding to a predetermined number of frames or a predetermined accumulation time, and outputs the plurality of frames to the search processing unit 2 together.

The frame accumulation information of the frame buffer 8 is information representing, for example, a frame accumulation amount or the presence/absence of frame accumulation. Only when it is determined based on the frame accumulation information that frames are accumulated in the frame buffer 8, frame information accumulation continues even after the elapse of a predetermined accumulation time.

Figure 18:
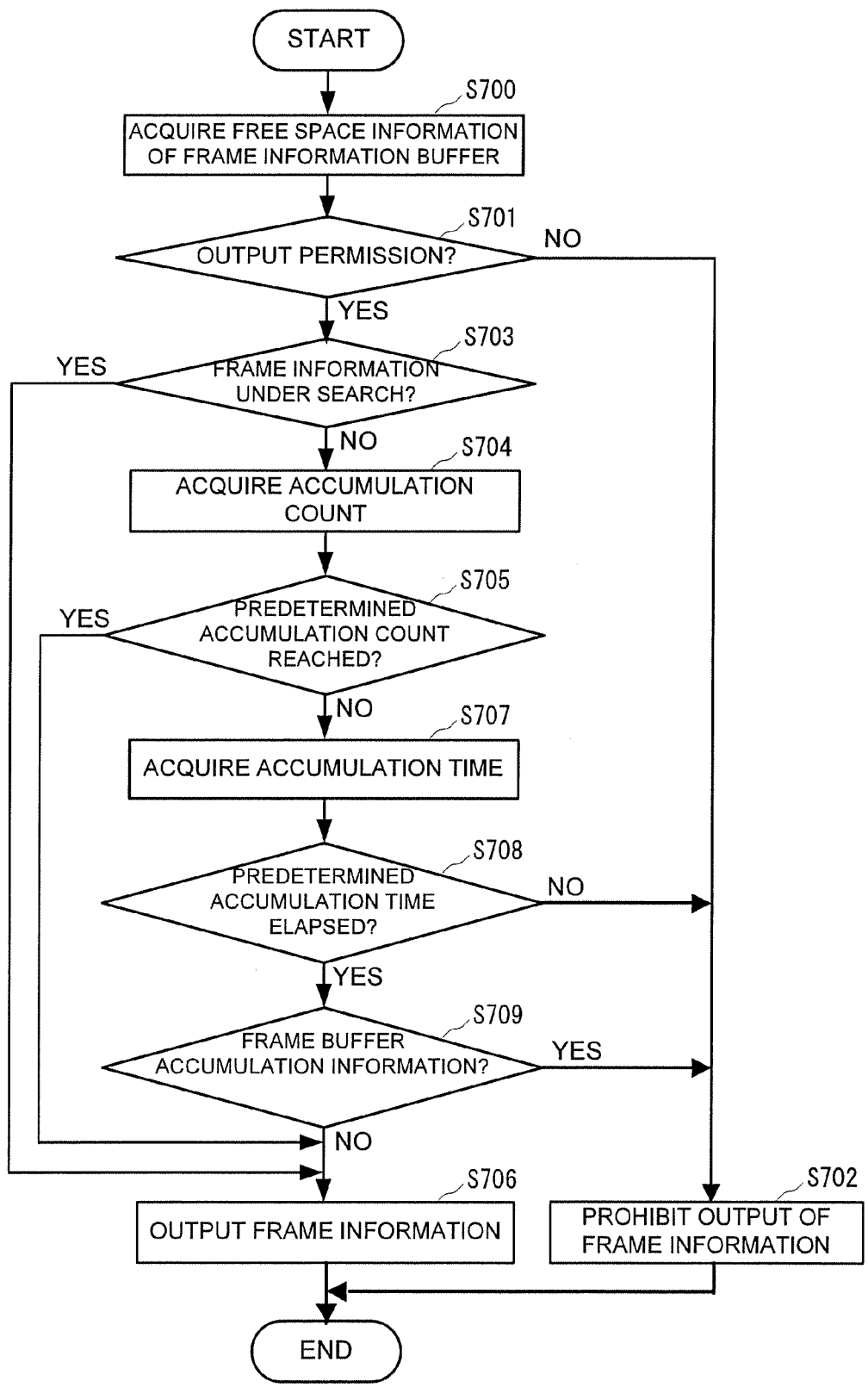
FIG. 18 is a flowchart showing the operation of an output processing unit of a frame information output control unit according to the fourth embodiment of the present invention when reading out frame information from a frame information buffer and outputting it to a search processing unit.

The operation of the frame information output control unit 3b when reading out frame information from a frame information buffer 30 and outputting it to the search processing unit 2 will be described next. FIG. 18 is a flowchart showing the operation of an output processing unit 32 of the frame information output control unit 3b when reading out frame information from the frame information buffer 30 and outputting it to the search processing unit 2.

Operations of steps S700, S701, S702, S703, S704, S705, S706, S707, and S708 of FIG. 18 are the same as in steps S200, S201, S202, S203, S204, S205, S206, S207, and S208 of FIG. 6, respectively, and a description thereof will be omitted.

When at least one timer value is 0, and at least one piece of frame information whose frame information accumulation time has exceeded a predetermined threshold time exists in the frame information buffer 30 (YES in step S708), the output processing unit 32 of the frame information output control unit 3b acquires frame accumulation information from the frame buffer 8 (step S709). Upon determining that a frame is accumulated in the frame buffer 8 (YES in step S709), the output processing unit 32 does not output the frame information (step S702). Upon determining that no frame is accumulated in the frame buffer 8 (NO in step S709), the output processing unit 32 reads out frame information from the frame information buffer 30, and outputs it to the search processing unit 2 (step S706).

As described above, even after the elapse of the predetermined accumulation time, when frames are accumulated in the frame buffer 8 connected to the subsequent stage of the frame search processing apparatus, frame information accumulation is continued independently of the elapse of the frame information accumulation time, unlike the first embodiment. Note that when the frame information accumulation count has reached a predetermined threshold, the frame information that is being accumulated is output to the search processing unit 2 independently of the frame accumulation information from the frame buffer 8.

If there is frame information under search processing in the search processing unit 2, and comparison circuits 21 of the search processing unit 2 include a free comparison circuit 21 that is not executing search processing (YES in step S703), the output processing unit 32 reads out frame information from the frame information buffer 30, and outputs it to the comparison circuit 21 of the search processing unit 2, which is not executing search processing, independently of the frame information accumulation count or the elapse of frame information accumulation time (step S706), as in the first embodiment.

The output processing unit 32 performs the above-described processing for a predetermined output control period.

Note that the operation of a write processing unit 31 of the frame information output control unit 3b when writing frame information in the frame information buffer 30 is the same as in the first embodiment.

Frames and frame information input in a state in which the frame buffer 4 or the frame information buffer 30 has no free space are discarded without being accumulated.

As described above, in this embodiment, the accumulation information of the frame buffer 8 connected to the subsequent stage of the frame search processing apparatus is added to the output conditions, thereby continuously outputting a plurality of frames to the search processing unit 2 in accordance with the accumulation situation in the frame buffer 8. This makes it possible to shorten the time of access to a search table 20 and reduce power consumption.

Note that the output control execution method using the accumulation information of the frame buffer 8 is not limited to the above method. For example, the output processing unit 32 may set a short threshold of the frame information accumulation time in advance, and prolong the threshold of the frame information accumulation time in accordance with the accumulation amount of the frame buffer 8.

An example in which a frame passes through the frame search processing apparatus and the frame information extraction unit 1 has been described above. However, the present invention is not limited to this arrangement. For example, frame search processing may be performed by extracting frame information from a frame accumulated in the frame buffer, instead of making a frame pass through the frame search processing apparatus and the frame information extraction unit 1.

The frame search processing apparatus described in each of the first to fourth embodiments can be implemented by, for example, a computer including a CPU, a storage device, and an interface, and a program that controls these hardware resources. The CPU executes the processing described in the first to fourth embodiments in accordance with the program stored in the storage device.

INDUSTRIAL APPLICABILITY

The present invention is applicable to search processing when performing transfer, discard, priority control, and the like of a frame in a router, a switch, or a bridge.

EXPLANATION OF THE REFERENCE NUMERALS AND SIGNS

1 . . . frame information extraction unit, 2 . . . search processing unit, 3, 3a, 3b . . . frame information output control unit, 4, 8 . . . frame buffer, 5 . . . search processing result buffer, 6 . . . frame reconstruction unit, 7 . . . advance notice information generation unit, 20 . . . search table, 21 . . . comparison circuit, 30 . . . frame information buffer, 31, 31a . . . write processing unit, 32, 32a . . . output processing unit, 33 . . . timer, 34 . . . accumulation count measuring unit, 100 . . . extraction processing unit, 101 . . . priority information notification unit, 102 . . . priority control table.

The invention claimed is:

1. A network device that processes input frames received from a network, the network device comprising:
 a frame information extraction unit that extracts frame information necessary for frame search processing from the respective input frames;
 a search processing unit that compares the frame information with entry information that is a predetermined search condition, the search processing unit including
  a search table that stores M (M is an integer: M≥2) pieces of entry information in advance, and
  a plurality of comparison units that each receive the frame information, read out N (N is a positive integer: N≤M) pieces of entry information out of the M pieces of entry information from the search table sequentially, and perform comparison between the received frame information and the readout entry information at once;
 a frame information output control unit that controls output of the frame information to the search processing unit, the frame information output control unit including
  a frame information buffer that accumulates a plurality of pieces of frame information extracted from the respective input frames by the frame information extraction unit, and
  an output processing unit that distributes, when triggered by one of accumulation count of the frame information accumulated in the frame information buffer and accumulation time of accumulating the frame information in the frame information buffer exceeding a predetermined threshold value, the plurality of pieces of frame information accumulated in the frame information buffer to the plurality of comparison units of the search processing unit one by one;
 a frame reconstruction unit that, based on a search processing result of the comparison performed by the search processing unit, rewrites the input frames and output the rewritten frames or discards the input frames; and
 an advance notice information generation unit that, when an input frame is received from the network, notifies, as advance notice information, the frame information output control unit that the frame information extraction unit is to extract the frame information,
 wherein the output processing unit of the frame information output control unit distributes, upon determining based on the advance notice information that no frame information is to be input to the frame information output control unit within a predetermined elapsed time, the plurality of pieces of frame information accumulated in the frame information buffer to the plurality of comparison units of the search processing unit one by one without waiting for the one of the accumulation count of the frame information accumulated in the frame information buffer and the accumulation time from the start of accumulating the frame information in the frame information buffer to exceed the predetermined threshold value, and if the frame information is, based on the advance notice information, known to be input to the frame information output control unit within the predetermined elapsed time, then continues accumulation of the frame information in the frame information buffer, and when triggered by one of accumulation count of the frame information accumulated in the frame information buffer and accumulation time from the start of accumulating the frame information in the frame information buffer exceeding the predetermined threshold value, distributes the plurality of pieces of frame information accumulated in the frame information buffer to the plurality of comparison units of the search processing unit one by one,
 wherein the accumulation count and the accumulation time start when the first frame information is written into the frame information buffer after frame information previously accumulated in the frame information buffer has been distributed, and
 the threshold of the frame information accumulation time is set to be shorter than the predetermined elapsed time.

2. A network device according to claim 1, wherein the output processing unit of the frame information output control unit changes a threshold of the predetermined accumulation count of the frame information in accordance with an accumulation time of the frame information, and changes a threshold of the predetermined accumulation time of the frame information in accordance with one of an accumulation count of the frame information and an accumulation amount of the frame information in the frame buffer.

3. A network device according to claim 1, further comprising a priority information notification unit that extracts priority information representing a priority of the frame when the frame information extraction unit extracts the frame information necessary for the search processing of the frame,
 wherein upon acquiring the priority information, the output processing unit of the frame information output control unit changes a threshold of the predetermined accumulation count of the frame information and a threshold of the predetermined accumulation time in accordance with the priority information.

4. A network device according to claim 1, wherein upon acquiring frame accumulation information from a frame buffer connected to a subsequent stage of the frame search processing apparatus and determining that no frame is accumulated in the frame buffer, the output processing unit of the frame information output control unit distributes the plurality of pieces of frame information accumulated in the frame information buffer to the comparison units of the search processing unit one by one, and upon determining that a frame is accumulated in the frame buffer, continues accumulation of the frame information in the frame information buffer, and triggered by the predetermined accumulation count of the frame information, distributes the plurality of pieces of frame information accumulated in the frame information buffer to the comparison units of the search processing unit one by one.

5. A frame search processing method performed in a network device that processes input frames received from a network, the frame search processing method comprising:
 a frame information extraction step of extracting frame information necessary for frame search processing from the respective input frames;
 a search processing step of comparing the frame information with entry information that is a predetermined search condition, the search processing step including steps of inputting the frame information of different frames to a plurality of comparison units, sequentially reading out N (N is a positive integer: N≤M) pieces of entry information out of M (M is an integer: M≥2) pieces of entry information stored in a search table in advance, and causing the plurality of comparison units to perform comparison between the readout entry information and the input frame information at once;

a frame information output control step of controlling output of the frame information to be used in the search processing step, the frame information output control step including a write step of accumulating, in a frame information buffer, a plurality of pieces of frame information extracted in the frame information extraction step, and an output processing step of distributing, when triggered by one of accumulation count of the frame information accumulated in the frame information buffer and accumulation time of accumulating the frame information in the frame information buffer exceeding a predetermined threshold value, the plurality of pieces of frame information accumulated in the frame information buffer to the plurality of comparison units to be used in the search processing step one by one;

a frame reconstruction step of, based on a search processing result of the comparison performed in the search processing step, rewriting the input frames and outputting the rewritten frames or discarding the input frames; and an advance notice information generation step of notifying, as advance notice information, that the frame information extracted from an input frame in the frame information extraction step is to be input into the frame information buffer, when the input frame is received from the network, wherein the output processing step of the frame information output control step includes a step of distributing, upon determining based on the advance notice information that no frame information is to be input to the frame information output control unit within a predetermined elapsed time, the plurality of pieces of frame information accumulated in the frame information buffer to the plurality of comparison units to be used in the search processing step one by one without waiting for the one of the accumulation count of the frame information accumulated in the frame information buffer and the accumulation time from the start of accumulating the frame information in the frame information buffer to exceed the predetermined threshold value, and if the frame information is, based on the advance notice information, known to be input to the frame information output control unit within the predetermined elapsed time, then continuing accumulation of the frame information in the frame information buffer, and when triggered by one of accumulation count of the frame information accumulated in the frame information buffer and accumulation time from the start of accumulating the frame information in the frame information buffer exceeding the predetermined threshold value, distributing the plurality of pieces of frame information accumulated in the frame information buffer to the plurality of comparison units to be used in the search processing step one by one, wherein the accumulation count and the accumulation time start when the first frame information is written into the frame information buffer after frame information previously accumulated in the frame information buffer has been distributed, and the threshold of the frame information accumulation time is set to be shorter than the predetermined elapsed time.

6. A frame search processing method according to claim 5, wherein the output processing step includes a step of changing a threshold of the predetermined accumulation count of the frame information in accordance with an accumulation time of the frame information and changing a threshold of the predetermined accumulation time of the frame information in accordance with one of an accumulation count of the frame information and an accumulation amount of the frame information in the frame buffer.

7. A frame search processing method according to claim 5, further comprising a priority information notification step of outputting priority information representing a priority of the frame at the same time as output of the frame information extracted from the input frame to the frame information buffer when the input frame is input in the frame information extraction step, wherein the output processing step includes, a step of, upon acquiring the priority information, changing a threshold of the predetermined accumulation count of the frame information and a threshold of the predetermined accumulation time in accordance with the priority information.

8. A frame search processing method according to claim 5, wherein the output processing step includes a step of, upon acquiring frame accumulation information from a frame buffer that accumulates the frame that has undergone the search processing in the search processing step and determining that no frame is accumulated in the frame buffer, distributing the plurality of pieces of frame information accumulated in the frame information buffer to the comparison units to be used in the search processing step one by one, and upon determining that a frame is accumulated in the frame buffer, continuing accumulation of the frame information in the frame information buffer, and triggered by the predetermined accumulation count of the frame information, distributing the plurality of pieces of frame information accumulated in the frame information buffer to the comparison units to be used in the search processing step one by one.

9. A frame search processing apparatus according to claim 1, wherein the output processing unit of the frame information output control unit decreases a threshold of the predetermined accumulation count of the frame information in accordance with an increase in an accumulation time of the frame information, and decreases a threshold of the predetermined accumulation time of the frame information in accordance with one of an increase in an accumulation count of the frame information and an increase in an accumulation amount of the frame information in the frame buffer.

10. A frame search processing method according to claim 5, wherein the output processing step includes a step of decreasing a threshold of the predetermined accumulation count of the frame information in accordance with an increase in an accumulation time of the frame information and decreasing a threshold of the predetermined accumulation time of the frame information in accordance with one of an increase in an accumulation count of the frame information and an increase in an accumulation amount of the frame information in the frame buffer.

* * * * *